(12) United States Patent
Dibua et al.

(10) Patent No.: US 12,546,185 B2
(45) Date of Patent: Feb. 10, 2026

(54) LOW MAINTENANCE FLUID VALVE SYSTEMS AND METHODS

(71) Applicant: Cactus Wellhead, LLC, Houston, TX (US)

(72) Inventors: Imoukhuede Odion Dibua, Houston, TX (US); Bruno Oliveira de Freitas, Spring, TX (US)

(73) Assignee: Cactus Wellhead, LLC, Houston, TX (US)

( * ) Notice: Subject to any disclaimer, the term of this patent is extended or adjusted under 35 U.S.C. 154(b) by 0 days.

(21) Appl. No.: 19/203,433

(22) Filed: May 9, 2025

(65) Prior Publication Data

US 2025/0354457 A1 Nov. 20, 2025

Related U.S. Application Data

(60) Provisional application No. 63/648,836, filed on May 17, 2024.

(51) Int. Cl.
*E21B 34/02* (2006.01)
(52) U.S. Cl.
CPC ........ *E21B 34/025* (2020.05); *E21B 2200/01* (2020.05)
(58) Field of Classification Search
CPC .... E21B 34/02; E21B 34/025; E21B 2200/01; F16K 3/0227; F16K 3/0236
See application file for complete search history.

(56) References Cited

U.S. PATENT DOCUMENTS

| 3,188,049 | A |   | 6/1965  | Zawacki et al. |
|-----------|---|---|---------|----------------|
| 3,305,213 | A | * | 2/1967  | Grove .................. F16K 27/044 251/328 |
| 3,497,177 | A | * | 2/1970  | Hulsey ................. F16K 3/0227 251/363 |
| 4,124,194 | A | * | 11/1978 | Alvarez ................. F16K 3/186 251/328 |
| 4,313,458 | A | * | 2/1982  | Burns ....................... F16K 3/16 251/360 |
| 4,373,700 | A |   | 2/1983  | Buchta |
| 4,568,062 | A |   | 2/1986  | Regitz et al. |

(Continued)

FOREIGN PATENT DOCUMENTS

EP 0587006 B1 10/1996
GB 2272271 B 1/1996

*Primary Examiner* — Matthew R Buck
(74) *Attorney, Agent, or Firm* — Conrad J. Hsu

(57) ABSTRACT

The present disclosure provides techniques for improving operational efficiency of a well system that includes a fluid valve, which facilitates controlling supply of fracturing fluid. The fluid valve includes a valve body, which defines a valve bore, a gate cavity, and a seat pocket; a gate disposed within the gate cavity; a seat disposed within the seat pocket such that the seat abuts the gate; a seat pocket ring disposed within the seat pocket between the valve body and the seat; a bi-directional seal compressed between the seat pocket ring and the valve body; a one-way seal disposed between the seat pocket ring and the seat to block fluid flow from the gate cavity to the valve bore through an interface between the seat pocket ring and the seat; and a wiper ring disposed circumferentially around an inner end of the seat such that the wiper ring abuts the gate.

20 Claims, 6 Drawing Sheets

(56) References Cited

U.S. PATENT DOCUMENTS

| | | | |
|---|---|---|---|
| 4,771,805 A * | 9/1988 | Maa | F16K 25/00 |
| | | | 251/327 |
| 4,878,651 A | 11/1989 | Meyer | |
| 5,341,835 A * | 8/1994 | Lanning, II | F16K 3/0227 |
| | | | 137/246.22 |
| 5,346,178 A | 9/1994 | Baker | |
| 6,007,048 A | 12/1999 | Ungchusri et al. | |
| 6,260,822 B1 | 7/2001 | Puranik | |
| 6,345,668 B1 | 2/2002 | Reilly | |
| 6,401,747 B1 | 6/2002 | Cain et al. | |
| 6,497,277 B2 | 12/2002 | Cunningham et al. | |
| 6,664,572 B2 * | 12/2003 | Chatufale | F16K 3/207 |
| | | | 251/329 |
| 6,966,537 B2 * | 11/2005 | Sundararajan | F16K 3/0227 |
| | | | 251/175 |
| 7,481,239 B2 | 1/2009 | McGuire et al. | |
| 9,022,058 B2 | 5/2015 | Beisel et al. | |
| 9,850,740 B2 | 12/2017 | Atencio | |
| 10,233,721 B2 | 3/2019 | Hoang et al. | |
| 10,718,436 B2 | 7/2020 | Keith et al. | |
| 11,028,929 B2 | 6/2021 | McGuire et al. | |
| 11,041,569 B2 | 6/2021 | Krause et al. | |
| 11,047,205 B2 | 6/2021 | Atencio | |
| 11,047,485 B2 | 6/2021 | Al-Jarallah et al. | |
| 11,174,958 B2 | 11/2021 | Moseley et al. | |
| 11,199,270 B1 * | 12/2021 | Valera | F16K 5/0673 |
| 11,435,001 B2 | 9/2022 | Kalimuthu | |
| 11,572,956 B2 | 2/2023 | McGuire et al. | |
| 11,585,200 B1 | 2/2023 | Startz et al. | |
| 11,624,444 B2 | 4/2023 | Kalimuthu | |
| 11,655,900 B2 | 5/2023 | McGuire et al. | |
| 11,725,738 B2 | 8/2023 | Mullins et al. | |
| 11,796,069 B2 * | 10/2023 | Gavela | F16K 3/0227 |
| 11,913,318 B2 | 2/2024 | Startz et al. | |
| 12,181,066 B2 * | 12/2024 | Boyd | E21B 34/02 |
| 12,259,064 B2 | 3/2025 | McGuire et al. | |
| 2008/0164437 A1 * | 7/2008 | Lam | F16K 3/0236 |
| | | | 251/326 |
| 2016/0123109 A1 * | 5/2016 | Hoang | F16K 1/02 |
| | | | 251/355 |
| 2021/0239220 A1 * | 8/2021 | Linder | F16K 3/0236 |
| 2023/0167910 A1 * | 6/2023 | Daniels | F16K 27/044 |
| | | | 251/326 |
| 2023/0392704 A1 * | 12/2023 | Livingston | F16K 47/08 |

* cited by examiner

LOW MAINTENANCE FLUID VALVE SYSTEMS AND METHODS

CROSS-REFERENCE

The present disclosure claims priority to and benefit of U.S. Provisional Application No. 63/648,836, entitled "LOW MAINTENANCE FRACTURING VALVE SYSTEMS AND METHODS" and filed May 17, 2024, which is incorporated herein by reference in its entirety for all purposes.

BACKGROUND

The present disclosure generally relates to well systems and, more particularly, to a fluid valve that may be deployed in a well system.

A well system generally includes one or more fluid valves to facilitate controlling the flow of fluid into and/or out of a wellbore. For example, a well system may include one or more fluid valves that facilitate controlling the flow of produced fluid from the wellbore to a storage tank. As another example, to facilitate improving fluid production, a well system may include one or more fluid valves that facilitate controlling the flow of fracturing fluid from a fluid pump to the wellbore.

However, at least in some instances, fluid flowed through a fluid valve may include solid particles mixed therein. When not properly accounted for, flow of solid particles through a fluid valve in a well system may necessitate premature and/or frequent maintenance of the fluid valve, which, at least in some instances, limits production time and, thus, operational efficiency of the well system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a well system includes a wellhead, which is to be secured over a wellbore, and a fluid valve, which is to be fluidly coupled to the wellhead to facilitate controlling supply of fracturing fluid to the wellbore to fracture a surrounding formation. The fluid valve includes a valve body that defines a valve bore, a gate cavity that intersects with the valve bore, and a seat pocket concentric with the valve bore; a gate disposed within the gate cavity, in which the gate includes a flow-through opening that is to be axially aligned with the valve bore when the fluid valve is in an open state; a seat disposed within the seat pocket such that the seat directly abuts the gate; a seat pocket ring disposed within the seat pocket between the valve body and the seat; a bi-directional seal compressed between the seat pocket ring and the valve body; a one-way seal disposed between the seat pocket ring and the seat to block fluid flow from the gate cavity to the valve bore through an interface between the seat pocket ring and the seat; and a wiper ring disposed circumferentially around an axial inner end of the seat such that the wiper ring directly abuts the gate.

In another embodiments, a method of implementing a fluid valve in a well system includes forming a valve body to define a valve bore, a gate cavity that intersects with the valve bore, and a seat pocket concentric with the valve bore; disposing a seat pocket ring within the seat pocket such that a bi-directional seal is disposed between the seat pocket ring and the valve body; disposing a seat within the seat pocket such that the seat pocket ring is disposed between the seat and the valve body and a one-way seal is disposed between the seat pocket ring and the seat to block fluid flow from the gate cavity to the valve bore through an interface between the seat pocket ring and the seat; disposing a wiper ring circumferentially around an axial inner end of the seat; and disposing a gate within the gate cavity such that the gate directly abuts the seat and the wiper ring.

In a further embodiment, a well system includes a fluid valve. The fluid valve includes a valve body that defines a valve bore, a gate cavity that intersects with the valve bore, and a seat pocket concentric with the valve bore; a gate that is to be disposed within the gate cavity; a seat pocket ring that is to be disposed within the seat pocket; a bi-directional seal that is to be axially compressed between the valve body and the seat pocket ring; a seat that is to be disposed within the seat pocket ring such that an axial inner surface of the seat directly abuts an opposing sealing surface of the gate; a one-way seal that is to be disposed between the seat pocket ring and the seat to block fluid flow from the gate cavity to the valve bore through an interface between the seat and the seat pocket ring; and a spring excluder configured to be compressed axially between the seat and the seat pocket ring such that the spring excluder intersects with the interface between the seat pocket ring and the seat.

DETAILED DESCRIPTION

Figure 1:
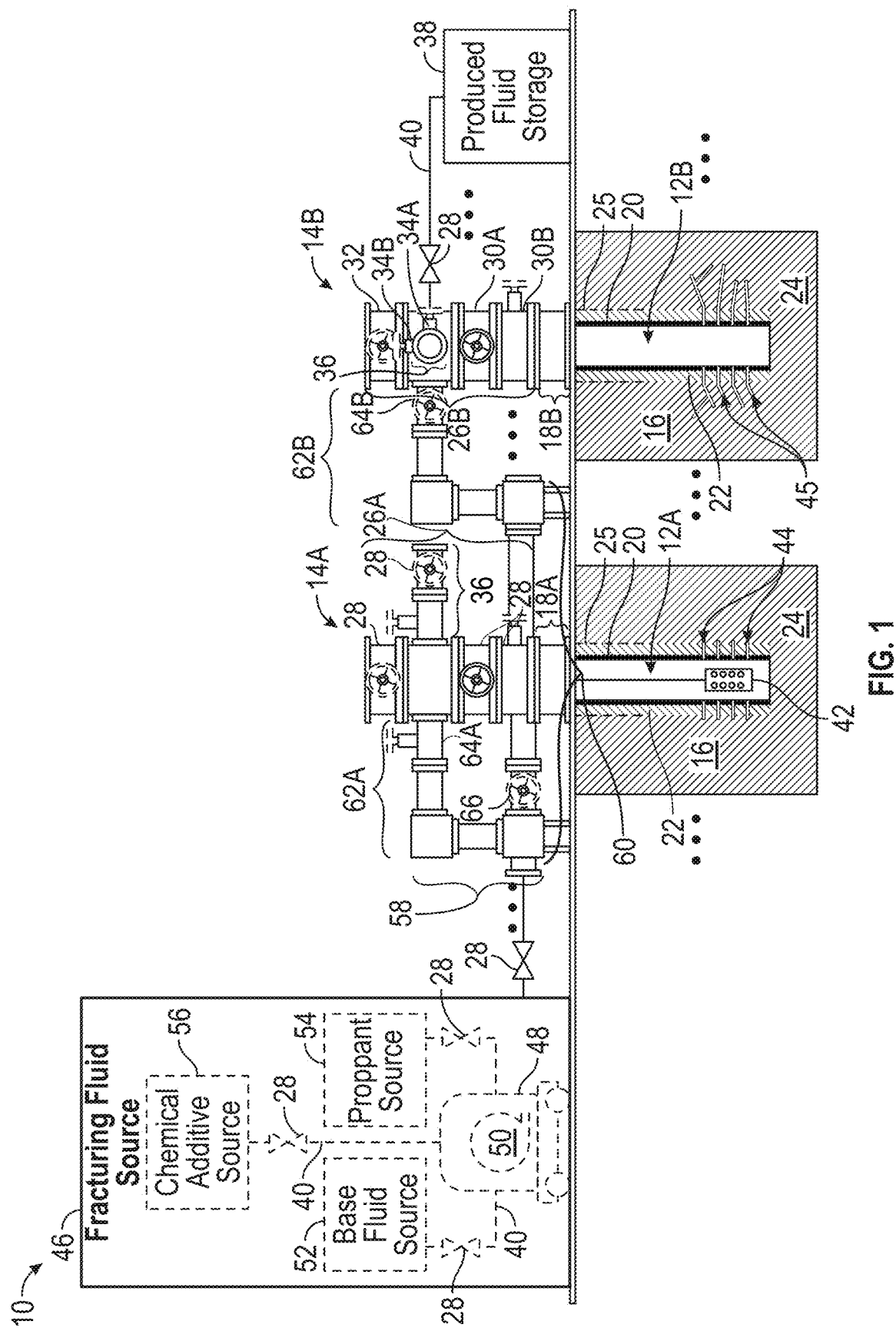
FIG. 1 is a partial side cross-sectional view of an example of a well system, in accordance with an embodiment of the present disclosure.

One or more specific embodiments of the present disclosure will be described below with reference to the figures. Wherever possible, like or identical reference numerals are used in the figures to identify common or the same features. The figures are not necessarily to scale. In particular, certain features and/or certain views of the figures may be shown exaggerated in scale for purposes of clarification. As used herein, the term "coupled" or "coupled to" may indicate establishing either a direct or indirect connection and, thus, is not limited to either unless expressly referenced as such.

The present disclosure generally relates to a well system. To help illustrate, an example of a well system 10 is shown in FIG. 1. As in the depicted example, a well system 10 generally includes a wellhead 18 secured over a wellbore 12 of a well 14. In particular, in the depicted example, the well system 10 includes a first wellhead 18A secured over a first wellbore 12A of a first well 14A and a second wellhead 18B secured over a second wellbore 12B of a second well 14B.

However, it should be appreciated that the depicted example is merely intended to be illustrative and not limiting. In particular, in other embodiments, a well system 10 may include a single well 14 and, thus, a single wellhead 18. Alternatively, in other embodiments, a well system 10 may include more than two (e.g., three, four, or more) wells 14 and, thus, more than two (e.g., three, four, or more) wellheads 18.

In any case, as depicted, a wellhead 18 on a well 14 may generally support and suspend a casing 20 within a corresponding wellbore 12 to facilitate fluidly isolating the wellbore 12 from surrounding formations 16 as well as structurally supporting the wellbore 12. As in the depicted example, to facilitate improving fluid isolation and/or structural support provided by a casing 20, in some embodiments, cement 22 may be found in an annulus surrounding the casing 20, for example, between the casing 20 and the surrounding formation 16 and/or between the casing 20 and an outer casing 20. In addition to a casing 20, as in the depicted example, in some embodiments, a wellhead 18 on a well 14 may be secured to and/or rest on a conductor pipe 25, for example, which is driven into the formation 16 before drilling of a corresponding wellbore 12.

However, it should again be appreciated that the depicted example is merely intended to be illustrative and not limiting. In particular, in other embodiments, a well 14 may not include a conductor pipe 25. Additionally or alternatively, in other embodiments, a well 14 may include multiple casings 20 concentrically secured to and suspended from a wellhead 18, for example, to enable its wellbore 12 to be cyclically drilled deeper.

In any case, as in the depicted example, to facilitate improving production from a well 14 as well as controlling fluid production from the well 14, a well system 10 may include a valve (e.g., fracturing) tree 26, which includes multiple fluid valves 28, secured on and fluidly connected to a corresponding wellhead 18. In particular, in the depicted example, the well system 10 includes a first valve tree 26A secured on the first wellhead 18A such that the first valve tree 26A is fluidly connected to the first wellhead 18A and, thus, the first wellbore 12A. Additionally, the well system 10 includes a second valve tree 26B secured on the second wellhead 18B such that the second valve tree 26B is fluidly connected to the second wellhead 18B and, thus, the second wellbore 12B.

However, it should again be appreciated that the depicted example is merely intended to be illustrative and not limiting. In particular, in other embodiments, a wellhead 18 may include one or more of its own fluid valves 28. Additionally, in other embodiments, a well system 10 may include more than two (e.g., three, four, or more) valve trees 26, for example, when the well system 10 includes more than two wells 14. Alternatively, in other embodiments, a well system 10 may include a single valve tree 26, for example, when the well system 10 includes a single well 14 or when the same valve tree 26 is to be used with multiple different wells 14 (e.g., at different times).

In any case, to provide master control over fluid flow into and/or out of a corresponding wellbore 12, as in the depicted example, the fluid valves 28 on a valve tree 26 generally include one or more master (e.g., working) valves 30. In particular, in the depicted example, each of the valve trees 26 includes an upper master valve 30A and a lower master valve 30B. Additionally, to provide external vertical access to a corresponding wellbore 12, as in the depicted example, the fluid valves 28 on a valve tree 26 generally include a swab (e.g., crown and/or working) valve 32 at the top of the valve tree 26.

Furthermore, to facilitate producing fluid from and/or injecting fluid into a corresponding wellbore 12, as in the depicted example, the fluid valves 28 on a valve tree 26 generally include one or more wing valves 34. In particular, in the depicted example, each of the valve trees 26 includes a first wing valve 34A and a second wing valve 34B connected in series on a wing valve branch 36 that extends out (e.g., horizontally) from a vertical extent of the valve tree 26. Additionally, to facilitate storing produced fluid for transportation and/or processing, as in the depicted example, a wing valve branch 36 on a valve tree 26 may be fluidly connected to a production fluid storage (e.g., tank) 38 via one or more fluid valves 28 and one or more fluid conduits 40, such as piping, tubing, or a hose.

However, it should again be appreciated that the depicted example is merely intended to be illustrative and not limiting. In particular, in other embodiments, a valve tree 26 may be fluidly connected directly to a produced fluid storage 38 without any other fluid valves 28 connected therebetween. Furthermore, in other embodiments, a valve tree 26 may include multiple wing valve branches 36, for example, which extend out in different (e.g., opposite) directions. Additionally or alternatively, in other embodiments, a wing valve branch 36 on a valve tree 26 may include a single wing valve 34 or more than two (e.g., three, four, or more) wing valves 34.

In any case, as described above, casing 20 disposed within a wellbore 12 may facilitate fluidly isolating the wellbore 12 from the surrounding formation 16. Accordingly, as shown in the first well 14A, to enable fluid to flow from a surrounding formation 16 through a corresponding casing 20 into a wellbore 12 and, thus, from the wellbore 12 through a valve tree 26 to a produced fluid storage 38, a wireline (e.g., perforation) tool 42 may be used to form perforations 44 in the casing 20, for example, in addition to the surrounding formation 16 and/or cement 22 formed between the casing 20 and the surrounding formation 16.

To facilitate improving fluid production, as shown in the second well 14B, fracturing fluid may then be pumped through a valve tree 26 into a corresponding wellbore 12 and, thus, perforations 44 formed therethrough to produce cracks (e.g., fractures) 45 in the surrounding formation 16. To facilitate supplying fracturing fluid to a valve tree 26, as in the depicted example, a fracturing fluid source 46 generally includes a fracturing fluid pump 50.

Additionally, in some embodiments, fracturing fluid may include a base fluid, such as water or methanol, mixed with proppant (e.g., solid particles), such as sand and/or ceramic beads, and one or more chemical additives, such as scale inhibitors (e.g., ethylene glycol), clay stabilizers (e.g., potassium chloride), corrosion inhibitors (e.g., propargyl alcohol), gelling agents (e.g., guar gum), pH adjustors (e.g., sodium carbonate), foaming agents (e.g., nitrogen gas), or any combination thereof. In some such embodiments, fracturing fluid may be pre-mixed before being transported to a well system 10.

However, in other embodiments, fracturing fluid may be mixed onsite in a well system 10, for example, to facilitate better accounting for (e.g., adaptively adjusting formulation of fracturing fluid for) potential well and/or formation variations. To facilitate mixing fracturing fluid on-site, a fracturing fluid source 46 may include a mixer (e.g., blender) 48 as well as a base fluid source (e.g., tank and/or pump) 52, a proppant source (e.g., tank or hopper) 54, and a chemical additive source (e.g., tank) 56, which are each fluidly connected to the mixer 48 via one or more corresponding fluid conduits 40 and one or more corresponding fluid valves 28.

However, it should again be appreciated that the depicted example is merely intended to be illustrative and not limiting. In particular, in other embodiments, a fracturing fluid source 46 in a well system 10 may not include a base fluid source 52, a proppant source 54, and/or a chemical additive source 56, for example, when fracturing fluid to be used in the well system 10 is at least partially mixed offsite.

In any case, as in the depicted example, to facilitate distributing fracturing fluid from a fracturing fluid source 46 between multiple different wells 14, in some embodiments, a well system 10 may include a header apparatus 58 fluidly connected between the fracturing fluid source 46 and corresponding valve trees 26. In particular, as in the depicted example, to facilitate controlling supply of fracturing fluid from a fracturing fluid source 46 to a header apparatus 58, in some embodiments, a well system 10 may include one or more fluid valves 28 and one or more fluid conduits 40 fluidly connected between the fracturing fluid source 46 and the header apparatus 58.

However, it should again be appreciated that the depicted example is merely intended to be illustrative and not limiting. In particular, in other embodiments, a header apparatus 58 may be fluidly connected directly to a fracturing fluid source 46 without any other fluid valves 28 connected therebetween.

In any case, as in the depicted example, to facilitate selectively distributing fracturing fluid from a fracturing fluid source 46 to multiple wells 14, a header apparatus 58 may generally include a header trunk 60 and multiple header branches 62, which each fluidly connects the header trunk 60 to a corresponding valve tree 26 and includes a fluid valve 28—namely a branch isolating (e.g., isolation) valve 64. In particular, in the depicted example, the header apparatus 58 includes a first header branch 62A, which fluidly connects a the header trunk 60 to the first valve tree 26A and includes a first branch isolating valve 64A connected therebetween, and a second header branch 62B, which fluidly connects the header trunk 60 to the second valve tree 26B and includes a second branch isolating valve 64B connected therebetween.

Additionally, as in the depicted example, in some embodiments, a header trunk 60 of a header apparatus 58 may include one or more trunk isolating (e.g., isolation) valves 66, for example, to facilitate supplying appropriately pressurized fracturing fluid to an upstream valve tree 26 with improved efficiency. Merely as an illustrative non-limiting example, to enable fracturing fluid to be supplied to the second valve tree 26B, the trunk isolating valve 66 may be in its open state to enable fracturing fluid to flow to the second header branch 62B. However, when fracturing fluid is to be supplied to the first valve tree 26A, the trunk isolating valve 66 may be in its closed state to block the fracturing fluid from flowing to the second header branch 62B to reduce the volume the fracturing fluid needs to fill and, thus, the time it takes to supply appropriately pressurized fracturing fluid to the first valve tree 26A, for example, as compared to merely closing the second branch isolating valve 64B on the second header branch 62B while leaving the header trunk 60 unimpeded (e.g., trunk isolating valve 66 in its open state). In other words, in such embodiments, a header trunk 60 of a header apparatus 58 may include N−1 trunk isolating valves 66 where N is the number of header branches 62 in the header apparatus 58.

However, it should again be appreciated that the depicted example is merely intended to be illustrative and not limiting. In particular, in other embodiments, a header trunk 60 of a header apparatus 58 may not include a trunk isolating valve 66, for example, when header branches 62 of the header apparatus 58 are sufficiently close together. Additionally, in other embodiments, a header branch 62 of a header apparatus 58 may not include a branch isolating valve 64, for example, when the header branch 62 is fluidly connected to a wing valve branch 36 of a corresponding valve tree 26 and, thus, a wing valve 34 can be used as a branch isolating valve 64. Alternatively, in other embodiments, a well system 10 may not include a header apparatus 58, for example, when the well system 10 includes a single well 14 or instead includes a zipper apparatus.

Figure 2:
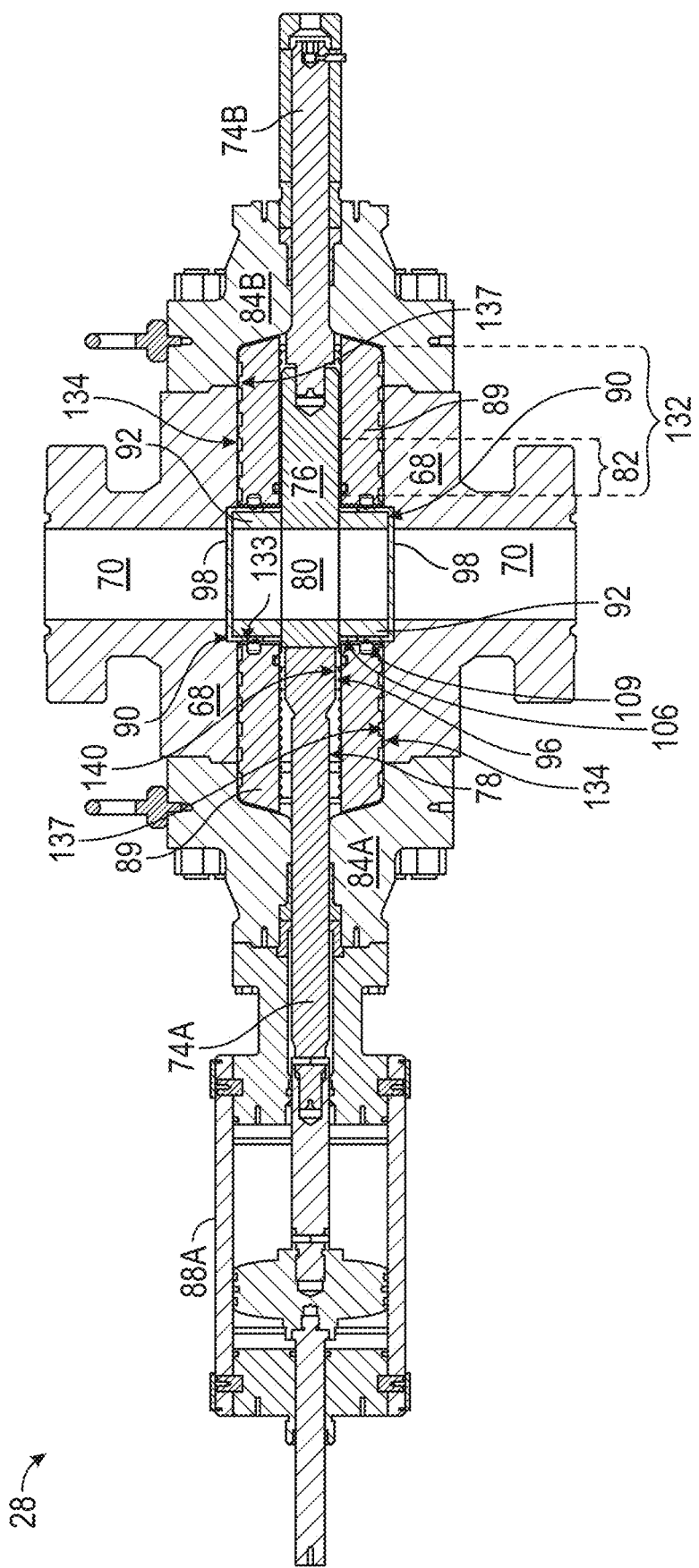
FIG. 2 is a side cross-sectional view of an example of a fluid valve that may be deployed in a well system, in accordance with an embodiment of the present disclosure.

In any case, an example of a fluid (e.g., gate) valve 28 that may be deployed in a well system 10 is shown in FIG. 2. As in the depicted example, a fluid valve 28 generally includes a valve body 68, which defines a valve bore 70 that extends therethrough. To facilitate controlling fluid flow through its valve bore 70, a fluid valve 28 may include a gate cavity 78, which intersects with the valve bore 70, and a gate 76, which is disposed within the gate cavity 78 and includes a flow-through opening 80 as well as a solid (e.g., blank) portion 82. In particular, in the depicted example, the gate cavity 78 is defined by the valve body 68, an actuator-side (e.g., first) bonnet 84A secured to the valve body 68, and a balance (e.g., second) bonnet 84B secured to the valve body 68 opposite the actuator-side bonnet 84A.

However, it should be appreciated that the depicted example is merely intended to be illustrative and not limiting. In particular, in other embodiments, a fluid valve 28 may only include a single (e.g., actuator-side) bonnet 84. Additionally or alternatively, in other embodiments, a bonnet 84 of a fluid valve 28 may be integrated with (e.g., formed as part of or welded to) its valve body 68 to form a single component, for example, when field maintenance of the fluid valve 28 and, thus, access to its gate cavity 78 is expected to be minimal or rarely needed.

In any case, when the flow-through opening 80 in the gate 76 axially overlaps with the valve bore 70, the gate 76 permits fluid flow through the valve bore 70 and, thus, the fluid valve 28 is in an open state. On the other hand, when the flow-through opening 80 does not axially overlap with the valve bore 70 (e.g., blank portion 82 of the gate 76 completely overlaps with the valve bore 70), the gate 76 blocks fluid flow through the valve bore 70 and, thus, the fluid valve 28 is in a closed state.

To facilitate moving (e.g., translating) the gate 76 of a fluid valve 28 and, thus, transitioning the fluid valve 28 between its open state and its closed state, as in the depicted example, an actuator 88 is generally secured to the gate 76 via an actuator-side (e.g., first) stem 74A, for example, which extends through an actuator-side bonnet 84A. In the depicted example, the fluid valve 28 additionally includes a balance (e.g., second) stem 74B, which extends through the balance bonnet 84B and is secured to the gate 76 opposite the actuator-side stem 74A, for example, to facilitate maintaining the gate 76 appropriately aligned (e.g., centralized) within the gate cavity 78 and, thus, the fluid valve 28. Additionally, in the depicted example, the actuator 88 is an automated (e.g., fluid-powered) actuator 88A, such as a hydraulic actuator 88 or a pneumatic actuator 88.

To facilitate easing movement of its gate 76 and, thus, transitioning of a fluid valve 28 between its open state and its closed state, the gate cavity 78 of the fluid valve 28 is often filled with lubricant, such as grease. Nevertheless, as in the depicted example and as will be described in more detail below, in some embodiments, a fluid valve 28 may include one or more cavity fillers 89 disposed within its gate cavity 78, for example, to facilitate reducing the amount of lubricant needed to fill the gate cavity 78 while nevertheless sufficiently lubricating its gate 76.

However, it should again be appreciated that the depicted example is merely intended to be illustrative and not limiting. In particular, in other embodiments, a fluid valve 28 may not include a balance bonnet 84B or a balance stem 74B, for example, when its valve bore 70 extends horizontally and, thus, gravity tends to keep its gate 76 appropriately aligned therein and/or due to cavity fillers 89 being disposed in its gate cavity 78. Nevertheless, in other embodiments, a fluid valve 28 may not include a cavity filler 89 disposed within its gate cavity 78, for example, when the fluid valve 28 otherwise blocks a corresponding open end of the flow-through opening 80 in its gate 76 while the fluid valve 28 is in its closed state (e.g., via a plate and/or a gate cavity 78 that closely conforms to the gate 76). Additionally, in other embodiments, an actuator 88 of a fluid valve 28 may be an electrical actuator 88 or a manual actuator 88, such as a hand wheel actuator 88.

In any case, in the depicted example, the valve body 68 of the fluid valve 28 additionally defines seat pockets 90 concentric with the valve bore 70. In particular, as depicted, a seat 92 and a seat pocket ring 98 are disposed within each seat pocket 90 to extend the valve bore 70 to the gate 76.

Figure 3:
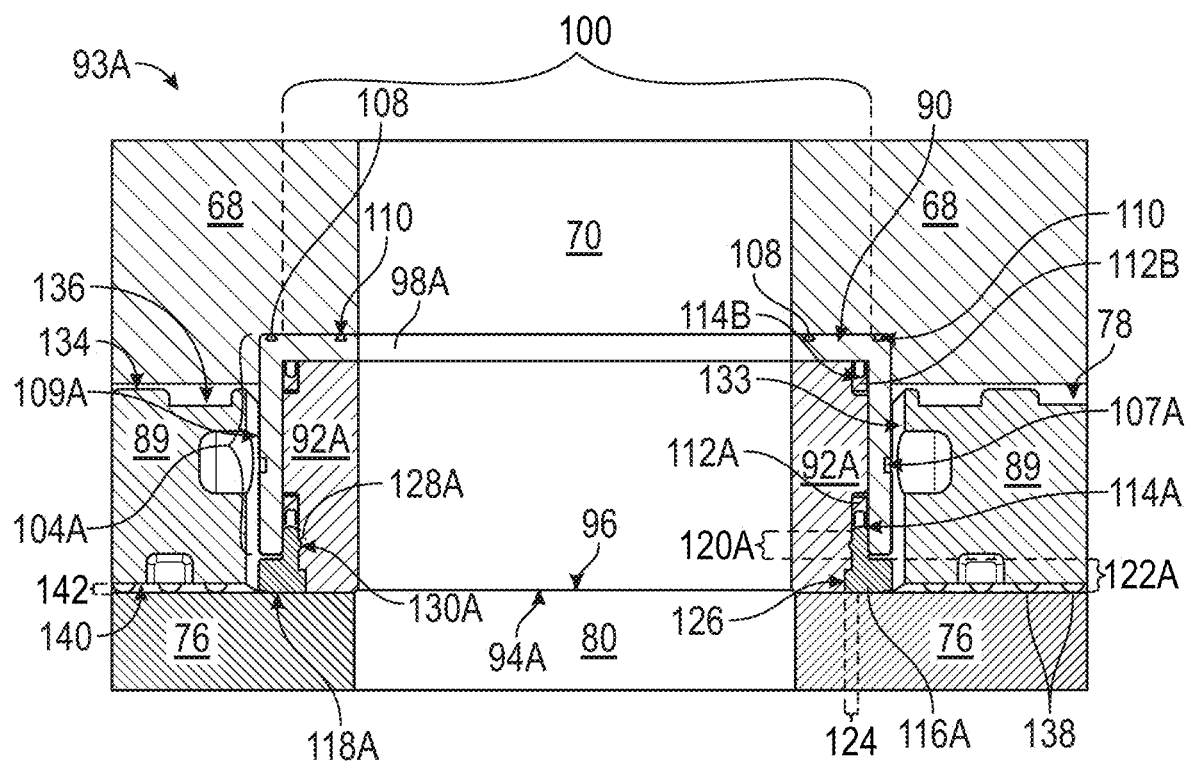
FIG. 3 is a more detailed cross-sectional view of an example of a portion of the fluid valve of FIG. 2, in accordance with an embodiment of the present disclosure.

To help more clearly illustrate, a close-up view of an example of a portion 93A of a fluid valve 28 is shown in FIG. 3. The fluid valve 28 of FIG. 3 generally matches the fluid valve 28 of FIG. 2. Accordingly, as depicted in FIG. 3, the fluid valve 28 includes a valve body 68, which defines a valve bore 70, a seat pocket 90, and a gate cavity 78.

Additionally, as depicted in FIG. 3, a seat 92A is disposed within the seat pocket 90. In particular, to facilitate blocking fluid from flowing from an upstream-side of the valve bore 70 into the gate cavity 78 and then from the gate cavity 78 to the downstream-side of the valve bore 70 and, thus, the fluid valve 28 from permitting substantial fluid flow therethrough even while in its closed state, an axial inner surface 94A of the seat 92A directly abuts an opposing sealing surface 96 of the gate 76 to form a metal-to-metal seal therebetween that separates the valve bore 70 and the gate cavity 78.

In addition to a seat 92, as in the depicted example, a fluid valve 28 may include a seat pocket ring 98 within a seat pocket 90 between the seat 92 and its valve body 68, for example, as a sacrificial component to facilitate reducing wear on the valve body 68 and/or the seat 92. In particular, in the depicted example, the seat pocket ring 98 includes a body portion 100, which is disposed axially between the valve body 68 and the seat 92A, and a leg (e.g., axial) portion 104A, which extends axially inward from an outer circumference of the body portion 100 such that the leg portion 104A is disposed radially between the valve body 68 and the seat 92A as well as between the cavity fillers 89 and the seat 92A. Additionally, as in the depicted example, a seat pocket ring 98 may include a (e.g., first) handling notch (e.g., recess and/or groove) 107A on its radial outer surface

109A, for example, to facilitate handling the seat pocket ring 98 and, thus, installing it within and/or removing it from a fluid valve 28.

However, it should be appreciated that the depicted example is merely intended to be illustrative and not limiting. In particular, in other embodiments, a seat pocket ring 98 in a fluid valve 28 may not include a handling notch 107A. Additionally or alternatively, in other embodiments, a seat pocket ring 98 in a fluid valve 28 may have a different cross-sectional shape, for example, which only includes a body (e.g., radial) portion 100.

In any case, to facilitate blocking fluid from inadvertently flowing through an interface between its valve body 68 and a corresponding seat pocket ring 98, as in the depicted example, a fluid valve 28 may include one or more bi-directional seals 108, which are each compressed between its valve body 68 and the seat pocket ring 98. In particular, to facilitate retaining a bi-directional seal 108 in place, in the depicted example, the bi-directional seal 108 is disposed within a corresponding seal groove 110 in the seat pocket ring 98A.

Additionally, in some embodiments, a bi-directional seal 108 in a fluid valve 28 may be an elastomer (e.g., rubber) seal, such as an O-ring. Thus, to facilitate sealing in such embodiments, a bi-directional seal 108 may extend out from a corresponding seal groove 110 before being compressed. Accordingly, when axially compressed between a valve body 68 and a seat pocket ring 98, a bi-directional seal 108 may push the seat pocket ring 98 and, thus, a corresponding seat 92 axially toward the gate 76, which facilitates maintaining a metal-to-metal seal therebetween.

However, it should again be appreciated that the depicted example is merely intended to be illustrative and not limiting. In particular, in other embodiments, a fluid valve 28 may include a single bi-directional seal 108 or more than two (e.g., three, four, or more) bi-directional seals 108 disposed between its valve body 68 and a seat pocket ring 98. Additionally or alternatively, in other embodiments, a fluid valve 28 may include a bi-directional seal 108 disposed radially between its valve body 68 and a seat pocket ring 98. Furthermore, in other embodiments, a seal groove 110 for a bi-directional seal 108 may be additionally (e.g., partially) or alternatively formed in the valve body 68 of a fluid valve 28.

In any case, as in the depicted example, a fluid valve 28 may additionally include one or more one-way seals 112 disposed between a seat 92 and a corresponding seat pocket ring 98. As in the depicted example, in some embodiments, a one-way seal 112 may have a U-shaped cross-section to block fluid flow from its open end towards its closed end while permitting fluid flow from its closed end towards its open end and, thus, may be thermoplastic, such as polypropylene or the like. In particular, in the depicted example, the fluid valve 28 includes a cavity-side (e.g., first and/or inner) one-way seal 112A, which is disposed between the seat 92A and the seat pocket ring 98A in a first seal recess 114A such that the cavity-side one-way seal 112A opens towards the gate 76 and the gate cavity 78, and a bore-side (e.g., second and/or outer) one-way seal 112B, which is disposed between the seat 92A and the seat pocket ring 98A in a second seal recess 114B such that the bore-side one-way seal 112B opens away from the gate 76 and toward the valve bore 70. In other words, the cavity-side one-way seal 112A together with the bore-side one-way seal 112B may block fluid flow through an interface between the seat 92A and the seat pocket ring 98A.

However, it should again be appreciated that the depicted example is merely intended to be illustrative and not limiting. In particular, although shown as formed in a seat 92, in other embodiments, a seal recess 114 for a one-way seal 112 may be additionally (e.g., partially) or alternatively be formed in a corresponding seat pocket ring 98. Additionally, in other embodiments, a one-way seal 112 in a fluid valve 28 be oriented in a different direction, for example, orthogonal to a corresponding gate 76. Furthermore, to facilitate improving sealing integrity, in other embodiments, a fluid valve 28 may include more than two (e.g., three, four, or more) one-way seals 112 disposed between a seat 92 and a corresponding seat pocket ring 98, for example, such that a first subset open toward its gate cavity 78 while a second subset open toward its valve bore 70. Moreover, in other embodiments, a fluid valve 28 may additionally or alternatively include one or more bi-directional seals 108 compressed between a seat 92 and a corresponding seat pocket ring 98.

In any case, as described above, a seat 92 in a fluid valve 28 may directly abut a gate 76 to form a metal-to-metal seal therebetween that facilitates blocking inadvertent flow of fluid and, thus, solid particles between its valve bore 70 and its gate cavity 78. However, a pressure differential between the valve bore 70 and the gate cavity 78 may develop, which, at least in some instances, increases resistance to movement of the gate 76, thereby undesirably necessitating more force to transition the fluid valve 28 between its open state and its closed state. Additionally, although some fluid flow may be desirable to enable pressure in the valve bore 70 and the gate cavity 78 to equalize, excessive flow of solid particles into the gate cavity 78 may necessitate premature and/or frequent maintenance of the fluid valve 28, which, at least in some instances, limits production time and, thus, operational efficiency of a corresponding well system 10, for example, due to the solid particles displacing and, thus, reducing the amount of lubricant in the gate cavity 78 and/or the solid particles scoring (e.g., scratching) a sealing surface 96 of the gate 76 and, thus, reducing the ability to form a metal-to-metal seal between the gate 76 and a corresponding seat 92.

Since the bi-directional seals 108 are axially compressed and, along with the opposing one-way seals 112, block fluid flow through the other potential flow paths, when a pressure differential is present in the depicted example, the seat 92A may move axially away from the gate 76 to produce a flow path between the axial inner surface 94A of the seat 92A and the opposing sealing surface 96 of the gate 76 to enable pressure equalization between the valve bore 70 and the gate cavity 78. Unfortunately, at least in some instances, a flow (e.g., pressure equalization) path produced between a gate 76 of a fluid valve 28 and a corresponding seat 92 may enable fluid as well as solid particles to flow between the valve bore 70 and the gate cavity 78 of the fluid valve 28.

Accordingly, to enable pressure equalization while blocking solid particles, as in the depicted example, a fluid valve 28 may additionally include one or more wiper rings 116. In particular, in the depicted example, the wiper ring 116A is disposed circumferentially around an axial inner end of the seat 92A such that an axial inner surface 118A of the wiper ring 116A directly abuts the opposing sealing surface 96 of the gate 76.

To facilitate blocking solid particles, in some embodiments, a wiper ring 116 in a fluid valve 28 may be pre-loaded (e.g., compressed during installation) such that the wiper ring 116 can decompress some amount while remaining directly abutted against a corresponding gate 76. In other words, even when a corresponding seat 92 moves away from the gate 76 to produce a flow (e.g., pressure equalization) path therebetween, in such embodiments, the wiper ring 116 may remain in direct contact with the gate 76 to nevertheless block the flow of solid particles between the valve bore 70 and the gate cavity 78. To enable pre-loading while improving the resistance to solid particle flow, in some embodiments, a wiper ring 116 in a fluid valve 28 may be elastic material, such as rubber and/or thermoplastic, such as polyether ether ketone (PEEK).

In any case, to facilitate maintaining direct abutment against the gate 76 and, thus, resistance to solid particle flow, in the depicted example, the wiper ring 116A includes a body portion 122A, which directly abuts the gate 76, and a leg (e.g., protruding and/or tab) portion 120A, which extends axially out from the body portion 122A into the first seal recess 114A toward the open end of the cavity-side one-way seal 112A. Accordingly, since the cavity-side one-way seal 112A blocks fluid flow from its open end towards its closed end, pressure that enters the first seal recess 114A (e.g., from gate cavity 78 and/or valve bore 70) toward the open end of the cavity-side one-way seal 112A may push the wiper ring 116 away from the cavity-side one-way seal 112A and, thus, toward the gate 76, thereby facilitating direct abutment therebetween to block solid particle flow.

To facilitate maintaining direct abutment against the gate 76 and, thus, resistance to solid particle flow, in the depicted example, the wiper ring 116A additionally includes an arm (e.g., protruding and/or tab) portion 124, which extends radially inward from its body portion 122A. In particular, in the depicted example, the arm portion 124 of the wiper ring 116A is disposed within a ring recess 126 in the seat 92A such that the arm portion 124 is disposed axially between the seat 92A and the gate 76. Accordingly, when the seat 92A directly abuts the gate 76, the seat 92A may block the wiper ring 116A from moving axially away from gate 76 and, thus, facilitate maintaining the wiper ring 116A directly abutted against the gate 76 to block solid particle flow.

Furthermore, as in the depicted example, to facilitate retaining a wiper ring 116 with a corresponding seat 92, in some embodiments, the wiper ring 116 may include a retainer tab (e.g., protrusion) 128, which extends radially inward and interlocks with a retainer notch (e.g., groove) 130 on the seat 92. In particular, in the depicted example, the retainer tab 128A extends radially inward from the leg portion 120A of the wiper ring 116A.

In fact, when pressure equalizes through an interface between a gate 76 and a corresponding seat 92, a retainer tab 128 on a corresponding wiper ring 116 may facilitate bringing the seat 92 back into contact with the gate 76. In particular, in the depicted example, when a pre-loaded elastic material, the wiper ring 116A may enable the seat 92A to move away from the gate 76 a small amount (e.g., to enable pressure equalization between the valve bore 70 and the gate cavity 78) while the retainer tab 128A on the wiper ring 116A remains interlocked with the retainer notch 130A on the seat 92A to subsequently pull the seat 92A back toward the gate 76 (e.g., after pressure is sufficiently equalized).

However, it should again be appreciated that the depicted example is merely intended to be illustrative and not limiting. In particular, as will be described in more detail below, in other embodiments, a wiper ring 116 in a fluid valve 28 may have a different cross-sectional shape. Furthermore, in other embodiments, a fluid valve 28 may additionally include a spring excluder, for example, to facilitate instead producing a pressure equalization path between a seat 92 and a corresponding seat pocket ring 98 while nevertheless blocking excessive flow of solid particles into its gate cavity 78.

Figure 4:
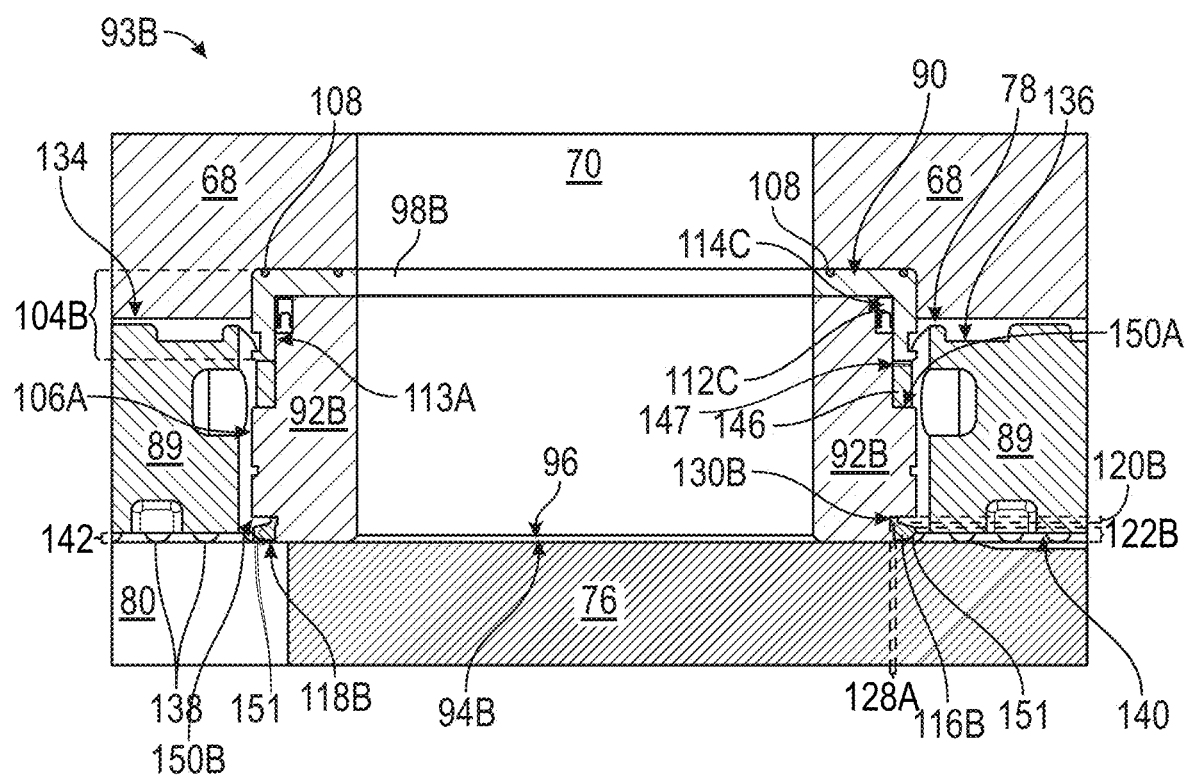
FIG. 4 is a more detailed cross-sectional view of another example of a portion of the fluid valve of FIG. 2, in accordance with an embodiment of the present disclosure.

To help illustrate, a close-up view of another example of a portion 93B of a fluid valve 28 is shown in FIG. 4. Similar to the fluid valve 28 of FIG. 3, the fluid valve 28 of FIG. 4 includes a valve body 68, which defines a valve bore 70, a seat pocket 90, and a gate cavity 78, and a gate 76 disposed within the gate cavity 78. Additionally, similar to the fluid valve 28 of FIG. 3, the fluid valve 28 of FIG. 4 includes a seat 92B, which is disposed within the seat pocket 90, and a seat pocket ring 98B, which is disposed within the seat pocket 90 between the seat 92B and the valve body 68.

Furthermore, similar to the fluid valve 28 of FIG. 3, the fluid valve 28 of FIG. 4 includes bi-directional seals 108 compressed between the seat pocket ring 98B and the valve body 68 to block fluid flow through an interface therebetween. Moreover, similar to the fluid valve 28 of FIG. 3, the fluid valve 28 of FIG. 4 includes a cavity-side one-way seal 112C, which is disposed between the seat 92B and the seat pocket ring 98B in a seal recess 114C such that the cavity-side one-way seal 112C opens toward the gate 76 and the gate cavity 78. In other words, similar to the cavity-side one-way seal 112A of FIG. 3, the cavity-side one-way seal 112C of FIG. 4 may block fluid flow from the gate cavity 78 to the valve bore 70 through an interface between the seat 92B and the seat pocket ring 98B.

However, to enable pressure equalization while blocking flow of solid particles into its gate cavity 78, the fluid valve 28 of FIG. 4 additionally includes a spring excluder 146 disposed axially between the seat pocket ring 98B and the seat 92B. In particular, in the depicted example, the spring excluder 146 is disposed axially between a leg portion 104B of the seat pocket ring 98B and a (e.g., outer and/or first) shoulder 150A on the seat 92B. In other words, as depicted, the spring excluder 146 intersects with an interface between the seat pocket ring 98B and the seat 92B.

Additionally, the spring excluder 146 may be pre-loaded (e.g., compressed during installation) and, thus, may push the seat 92B axially towards the gate 76. In fact, in some embodiments, a spring excluder 146 may facilitate maintaining an axial inner surface 94 of a seat 92 in constant contact with an opposing sealing surface 96 of a corresponding gate 76 to produce a fluid-tight metal-to-metal seal therebetween, for example, as compared to temporarily providing a fluid (e.g., pressure equalization) path therebetween.

Accordingly, to facilitate pressure equalization, the spring excluder 146 may permit fluid flow there past. In other words, to facilitate pressure equalization, the fluid valve 28 of FIG. 4 may provide a fluid (e.g., pressure equalization) path from its valve bore 70 to its gate cavity 78 through an interface between the seat 92B and the seat pocket ring 98B. Thus, to facilitate blocking excessive flow of solid particles from the valve bore 70 into the gate cavity 78, as in the depicted example, a spring excluder 146 in a fluid valve 28 may be a solid continuous ring, for example, as compared to a coiled spring. Thus, in some embodiments, a spring excluder 146 in a fluid valve 28 may be elastic material, such as rubber or urethane. Additionally, due to being compressed between a seat 92 and a corresponding seat pocket ring 98, as in the depicted example, to facilitate fluid flow there past and, thus, pressure equalization, a spring excluder 146 may include one or more fluid notches (e.g., contours and/or gaps) 147 that extend radially along (e.g., across) an axial (e.g., end) surface.

However, it should be appreciated that the depicted example is merely intended to be illustrative and not limiting. In particular, to facilitate permitting fluid flow there past, in other embodiments, a spring excluder 146 in a fluid valve 28 may additionally or alternatively include flow-through openings extending radially therethrough. Additionally or alternatively, although depicted with a rectangular cross-sectional shape, in other embodiments, a spring excluder 146 in a fluid valve 28 may have a different cross-sectional shape, such as trapezoidal cross-sectional shape or a circular cross-sectional shape. In fact, in other embodiments, the target cross-sectional shape of a spring excluder 146 may be adjusted based on material (e.g., metal) of the spring excluder 146, for example, such that it exhibits the same or similar properties as a urethane spring excluder 146. Furthermore, in other embodiments, a spring excluder 146 in a fluid valve 28 may not include a fluid notch 147 or a flow-through opening, for example, instead relying on material of the spring excluder 146 to permit fluid flow there past while blocking solid particles.

In any case, although a pressure equalization path is provided via the interface between the seat 92B and the seat pocket ring 98B, the fluid valve 28 of FIG. 4 nevertheless includes a wiper ring 116B. In particular, similar to the wiper ring 116A of FIG. 3, the wiper ring 116B of FIG. 4 is disposed circumferentially around an axial inner end of the seat 92B such that an axial inner surface 118B of the wiper ring 116B directly abuts the opposing sealing surface 96 of the gate 76.

However, as depicted in FIG. 4, the wiper ring 116B axially abuts the seat 92B and, more specifically, a (e.g., inner and/or second) shoulder 150B on the seat 92B. Nevertheless, similar to the wiper ring 116A of FIG. 3, the wiper ring 116B of FIG. 4 may be pre-loaded (e.g., compressed during installation) and, thus, may exert force that attempts to push the seat 92B axially away from the gate 76.

In other words, a wiper ring 116 in a fluid valve 28 with a spring excluder 146 may facilitate offsetting axial force exerted by the spring excluder 146 that pushes a corresponding seat 92 against the gate 76 of the fluid valve 28. In fact, the cross-sectional shape of a wiper ring 116 may be designed to adjust the axial force exerted on a corresponding seat 92 such that the force sufficient to transition the gate 76 between its open state and its closed state is reduced while an axial inner surface 118 of the wiper ring 116 remains directly abutted against an opposing sealing surface 96 of the gate 76 to facilitate maintaining a fluid-tight metal-to-metal seal therebetween.

To this end, in the depicted example, the wiper ring 116B includes a body portion 122B, which directly abuts the gate 76, and a leg (e.g., protruding and/or tab) portion 120B, which extends axially out from the body portion 122B and axially abuts the seat 92B. Nevertheless, similar to FIG. 3, to facilitate retaining the wiper ring 116B of FIG. 4 with the seat 92B, the leg portion 120B of the wiper ring 116B includes a retainer tab (e.g., protrusion) 128B, which extends radially inward and interlocks with a retainer notch (e.g., groove) 130B on the seat 92B.

Additionally, to facilitate reducing the likelihood of solid particles being trapped between the seat 92B and the wiper ring 116B and, thus, force that pushes the seat 92B toward the gate 76 inadvertently increasing, in the example depicted in FIG. 4, the cross-sectional shape of the body portion 122B of the wiper ring 116B tapers radially inward toward the leg portion 120B of the wiper ring 116B. In particular, the taper on the body portion 122B of the wiper ring 116B may tend to radially displace solid particles such that the solid particles are no longer positioned axially between the seat 92B and the wiper ring 116B, for example, due to gravity and/or axial force exerted on the solid particle by the seat 92B.

Furthermore, as shown by the dashed line in FIG. 4, a portion of a wiper ring 116 may deform axially inward such that it overlaps with a corresponding gate 76 when not directly abutted against the gate 76, for example, due to being pre-loaded and/or while overlapping with a flow-through opening 80 in the gate 76. Accordingly, to facilitate reducing the likelihood of the gate 76 inadvertently catching on the wiper ring 116B, in the depicted example, the body portion 122B of the wiper ring 116B includes a beveled (e.g., tapered) edge (e.g., corner) 151, which is connected to its axial inner surface 118B and opposes the gate 76, and the axial inner surface 118B of the wiper ring 116B slants axially inwardly to the beveled edge 151 when not abutted against the gate 76, thereby providing a smooth (e.g., gradual) transition when the gate 76 is moved back into direct abutment with the wiper ring 116B.

Nevertheless, it should again be appreciated that the depicted example is merely intended to be illustrative and not limiting. In particular, in other embodiments, a wiper ring 116 in a fluid valve 28 may have a different cross-sectional shape, such as a rectangular cross-sectional shape, a circular cross-sectional shape, or a trapezoidal cross-sectional shape. Alternatively, in other embodiments, a fluid valve 28 that includes a spring excluder 146 may not include a wiper ring 116, for example, due to the spring excluder 146 maintaining a corresponding seat 92 directly abutted against the gate 76 to maintain a fluid-tight metal-to-metal seal therebetween.

In any case, returning to FIG. 2, as described above, a fluid valve 28 may be in its open state and, thus, enable fluid flow therethrough when a flow-through opening 80 in its gate 76 axially overlaps with its valve bore 70. Accordingly, the fluid valve 28 may be transitioned to its closed state to block fluid flow therethrough by moving the gate 76 such that its flow-through opening 80 does not axially overlap with the valve bore 70. In fact, at least in some instances, when a fluid valve 28 transitions from its open state to its closed state, fluid from its valve bore 70 may remain within the flow-through opening 80 in its gate 76 and, thus, gravity and/or fluid pressure may attempt to flow the fluid from the flow-through opening 80 into the gate cavity 78 of the fluid valve 28.

Additionally, as described above, in some embodiments, fluid, such as fracturing fluid, that is flowed through the valve bore 70 of a fluid valve 28 may include solid particles, such as proppants and/or debris, mixed therein. In other words, at least in some such embodiments, transitioning a fluid valve 28 from its open state to its closed state may result in solid particles entering its gate cavity 78 from the flow-through opening 80 in its gate 76. However, as described above, although some fluid flow may be desirable to enable pressure equalization between the valve bore 70 and the gate cavity 78, excessive flow of solid particles into the gate cavity 78 may necessitate premature (e.g., frequent) maintenance of the fluid valve 28 and/or hinder proper (e.g., full) operation of the fluid valve 28, for example, due to the solid particles displacing and, thus, reducing the amount of lubricant in the gate cavity 78 and/or the solid particles scoring (e.g., scratching) a sealing surface 96 of the gate 76 and/or an axial inner surface 94 of a corresponding seat 92 and, thus, reducing the ability to form a metal-to-metal seal between the gate 76 and the seat 92.

In fact, in addition to reducing the amount of lubricant needed to sufficiently lubricate a corresponding gate 76, as in the depicted example, cavity fillers 89 disposed within a gate cavity 78 of a fluid valve 28 may facilitate blocking excessive flow of solid particles into the gate cavity 78. In particular, to facilitate blocking flow of solid particles, in the depicted example, the cavity fillers 89 axially overlap with both open ends of the flow-through opening 80 in the gate 76 while the fluid valve 28 is in its closed state.

Accordingly, in the depicted example, the cavity fillers 89 are disposed circumferentially around the gate 76 as well as circumferentially around the seats 92 and the seat pocket rings 98. Thus, to enable disposal in the gate cavity 78, in the depicted example, the fluid valve 28 includes multiple (e.g., four) cavity fillers 89, which each has an external (e.g., radial outer) surface 134 that generally conforms to a corresponding gate cavity (e.g., valve body and/or bonnet) surface 137, an internal (e.g., radial inner) surface 140 that generally conforms to an opposing sealing surface 96 of the gate 76, and an axial inner surface 133 that generally conforms to a radial outer surface 109 of a corresponding seat pocket ring 98 and/or a radial outer surface 106 of a corresponding seat 92.

However, it should again be appreciated that the depicted example is merely intended to be illustrative and not limiting. In particular, in other embodiments, cavity fillers 89 in a fluid valve 28 may block only one open end of the flow-through opening 80 in a gate 76 while the fluid valve 28 is in its closed state, for example, when gravity opposes flow through an opposite open end of the flow-through opening 80. Additionally, in other embodiments, a fluid valve 28 may not include a cavity filler 89 in a portion 132 of its gate cavity 78 that does not overlap with the flow-through opening 80 in its gate 76 while the fluid valve 28 is in its closed state. Furthermore, in other embodiments, a fluid valve 28 may include more than four (e.g., five, six, or more) cavity fillers 89 disposed within its gate cavity 78 or fewer than four (e.g., three, two, or one) cavity fillers 89 disposed within its gate cavity 78, for example, when only one open end of the flow-through opening 80 in its gate 76 is blocked by cavity fillers 89 and/or cavity fillers 89 are not disposed within a portion 132 of its gate cavity 78 that never overlaps with the flow-through opening 80 in its gate 76.

In any case, as can be more clearly seen in FIGS. 3 and 4, a cavity filler 89 in a fluid valve 28 may include lubricant grooves (e.g., notches and/or recesses) 136 on its external surface 134. Additionally, as in the depicted examples, a cavity filler 89 in a fluid valve 28 may include spacer protrusions 138 on its internal surface 140 that protrude toward a corresponding gate 76 such that the spacer protrusions 138 directly abut the gate 76.

In other words, spacer protrusions 138 on a cavity filler 89 may facilitate maintaining a gap 142 between the internal surface 140 of the cavity filler 89 and an opposing sealing surface 96 of a corresponding gate 76. In particular, instead of merely filling volume in a gate cavity 78 to enable the gate cavity 78 to be filled with less lubricant, the gap 142 facilitates distributing lubricant along a corresponding length of the gate 76 and, thus, sufficiently lubricating the gate 76 using less lubricant.

Additionally, although some solid particles may nevertheless enter the gate cavity 78, the height of spacer protrusions 138 on a cavity filler 89 and, thus, the depth of a resulting gap 142 between the internal surface 140 of the cavity filler 89 and the gate 76 may limit the amount of solid particles that are able to flow from the flow-through opening 80 of the gate 76 into the gate cavity 78 when the fluid valve 28 is transitioned from its open state to its closed state. In particular, the cavity fillers 89 may block solid particles in the flow-through opening 80 of the gate 76 from completely emptying into the gate cavity 78, which, at least in some instances, facilitates reducing the amount of solid particles that enter the gate cavity 78 and, thus, reducing maintenance frequency. Moreover, the spacer protrusions 138 on a cavity filler 89 may displace (e.g., guide) solid particles that enter the gate cavity 78 into a corresponding gap 142 to facilitate reducing the likelihood of a solid particle being compressed directly between the cavity filler 89 and the gate 76 and, thus, scoring (e.g., scratching) a corresponding sealing surface 96 of the gate 76, which, at least in some instances, facilitates maintaining a metal-to-metal seal between the gate 76 and a corresponding seat 92 and, thus, reducing maintenance frequency.

Figure 5:
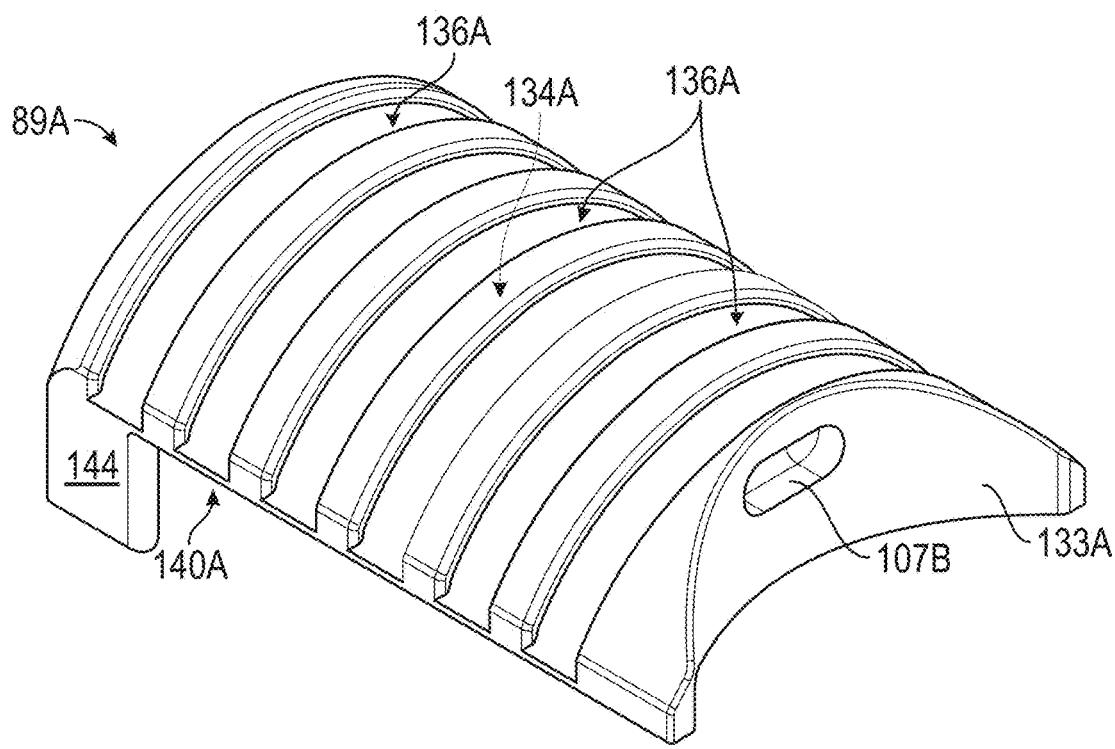
FIG. 5 is a perspective view of the external surface of an example of a cavity filler that may be included in the fluid valve of FIG. 2, in accordance with an embodiment of the present disclosure.
Figure 6:
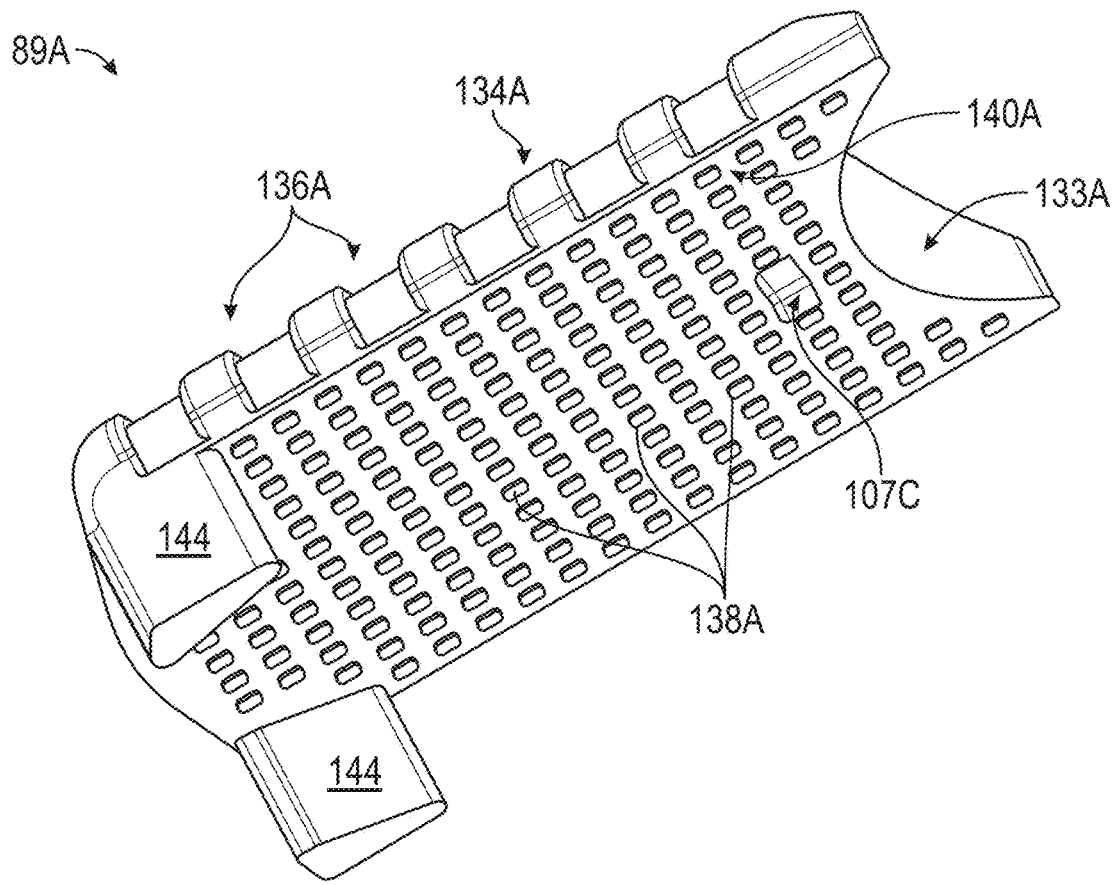
FIG. 6 is a perspective view of the internal surface of an example of a cavity filler that may be included in the fluid valve of FIG. 2, in accordance with an embodiment of the present disclosure.

To help further illustrate, an example of a cavity filler 89A that may be disposed in a gate cavity 78 of a fluid valve 28 is shown in FIGS. 5 and 6. As described above, an axial inner surface 133 of a cavity filler 89 may generally conform to the radial outer surface 106 of a corresponding seat 92 and/or the radial outer surface 109 of a corresponding seat pocket ring 98. In particular, in the depicted example, the axial inner surface 133A of the cavity filler 89A has a concave (e.g., rounded, curved, and/or circular) shape, for example, due to the radial outer surface 109 of a corresponding seat pocket ring 98 and/or the radial outer surface 109 of a corresponding seat 92 having a convex (e.g., rounded, curved, and/or circular) shape. Additionally, in the depicted example, the cavity filler 89A includes a (e.g., second) handling notch (e.g., recess and/or groove) 107B on its axial inner surface 133A, for example, to facilitate handling the cavity filler 89A and, thus, assembling (e.g., installing) the cavity filler 89A in and/or disassembling (e.g., removing) the cavity filler 89A from a fluid valve 28.

However, it should be appreciated that the depicted example is merely intended to be illustrative and not limiting. In particular, in other embodiments, the axial inner surface 133 of a cavity filler 89 may have a different shape. For example, the axial inner surface 133 of a cavity filler 89 may have a rectangular and/or flat shape when the outer surface 109 of a corresponding seat pocket ring 98 and/or the outer surface 106 of a corresponding seat 92 has a rectangular and/or flat shape. Additionally or alternatively, in other embodiments, the axial inner surface 133 of a cavity filler 89 may not include a handling notch 107B.

In any case, as described above, an external (e.g., radial outer) surface 134 of a cavity filler 89 generally conforms to a corresponding gate cavity (e.g., valve body and/or bonnet) surface 137. In particular, in the depicted example, the external surface 134A of the cavity filler 89A has a convex (e.g., curved, round, and/or circular) shape, for example, due to a corresponding gate cavity surface 137 having a concave (e.g., curved, rounded, and/or circular) shape.

Additionally, as in the examples shown in FIGS. 2-4, the cavity filler 89A of FIGS. 5 and 6 includes lubricant grooves 136A on its external surface 134A. In particular, in the depicted example, the lubricant grooves 136A extend circumferentially along the external surface 134A of the cavity filler 89A, for example, to facilitate evenly distributing lubricant around the gate cavity 78 of a fluid valve 28 when the fluid valve 28 includes unevenly distributed (e.g., a single) lubricant ports.

However, it should again be appreciated that the depicted example is merely intended to be illustrative and not limiting. In particular, in other embodiments, lubricant grooves 136 on a cavity filler 89 may have a different configuration (e.g., shape, placement, number, size, and/or orientation). Alternatively, in other embodiments, a cavity filler 89 in a fluid valve 28 may not include lubricant grooves 136 on its external surface 134, for example, when the fluid valve 28 includes multiple (e.g., two) evenly distributed lubricant ports. Furthermore, in other embodiments, the external surface 134 of a cavity filler 89 may have a different shape. For example, the external surface 134 of a cavity filler 89 may have a rectangular or flat shape when a corresponding gate cavity surface 137 has a rectangular or flat shape.

In any case, as described above, an internal (e.g., radial inner) surface 140 of a cavity filler 89 generally conforms to an opposing sealing surface 96 of a gate 76. In particular, in the depicted example, the internal surface 140A of the cavity filler 89A is generally flat, for example, due to an opposing sealing surface 96 of a gate 76 being flat.

Nevertheless, as in the examples shown in FIGS. 3 and 4, the cavity filler 89A of FIGS. 5 and 6 includes spacer protrusions 138A on its internal surface 140A, for example, to facilitate displacing solid particles in a corresponding gate cavity 78 such that they are not compressed directly between the cavity filler 89 and the gate 76 and/or to enable fluid flow from the flow-through opening 80 of the gate 76 into the gate cavity 78 and, thus, pressure equalization while limiting the flow of solid particles into the gate cavity 78. In particular, in the depicted example, the spacer protrusions 138A are arranged in a grid pattern on the internal surface 140A of the cavity filler 89A. Additionally, in the depicted example, the cavity filler 89A includes a (e.g., third) handling notch (e.g., recess and/or groove) 107C on its internal surface 140A, for example, to facilitate handling the cavity filler 89A and, thus, assembling (e.g., installing) the cavity filler 89A in and/or disassembling (e.g., removing) the cavity filler 89A from a fluid valve 28.

However, it should again be appreciated that the depicted example is merely intended to be illustrative and not limiting. In particular, in other embodiments, an internal surface 140 of a cavity filler 89 may not include a handling notch 107C and/or spacer protrusions 138. Additionally, in other embodiments, spacer protrusions 138 on the internal surface 140 of a cavity filler 89 may be arranged in a different pattern or order, such as staggered or checkered arrangement. Furthermore, in other embodiments, the internal surface 140 of a cavity filler 89 may have a different shape. For example, the internal surface 140 of a cavity filler 89 may be rounded (e.g., concave or convex) when an opposing sealing surface 96 of a gate 76 is rounded (e.g., convex or concave).

In any case, in the depicted example, the cavity filler 89A additionally includes legs 144 that extend inwardly from its internal surface 140A. In particular, if inadvertently displaced such that it axially overlaps with a corresponding gate 76, a cavity filler 89 may inadvertently hinder (e.g., limit and/or block) movement of the gate 76 and, thus, forcing the gate 76 past the displaced cavity filler 89 may cause the gate 76 to gouge (e.g., damage) the cavity filler 89 and/or the cavity filler 89 to score (e.g., damage) the gate 76. Accordingly, to facilitate maintaining proper alignment in a corresponding fluid valve 28, the legs 144 of the cavity filler 89A may directly abut the legs 144 of an opposing cavity filler 89 in the fluid valve 28.

However, it should again be appreciated that the depicted example is merely intended to be illustrative and not limiting. In particular, in other embodiments, a leg 144 of a cavity filler 89 may extend the length of the cavity filler 89. Additionally or alternatively, in other embodiments, a cavity filler 89 may include a single leg 144, for example, when an opposing cavity filler 89 also includes a single complimentary (e.g., opposite) leg 144. In any case, in this manner, the techniques provided in the present disclosure (e.g., wiper ring 116, spring excluder 146, and/or cavity filler 89) enable a fluid valve 28 in a well system 10 to equalize pressure between its valve bore 70 and its gate cavity 78 while nevertheless blocking excessive flow of solid particles into its gate cavity 78, which, at least in some instances, may facilitate reducing the maintenance frequency of the fluid valve 28 and, thus, improving operational efficiency (e.g., production time) of the well system 10.

Figure 7:
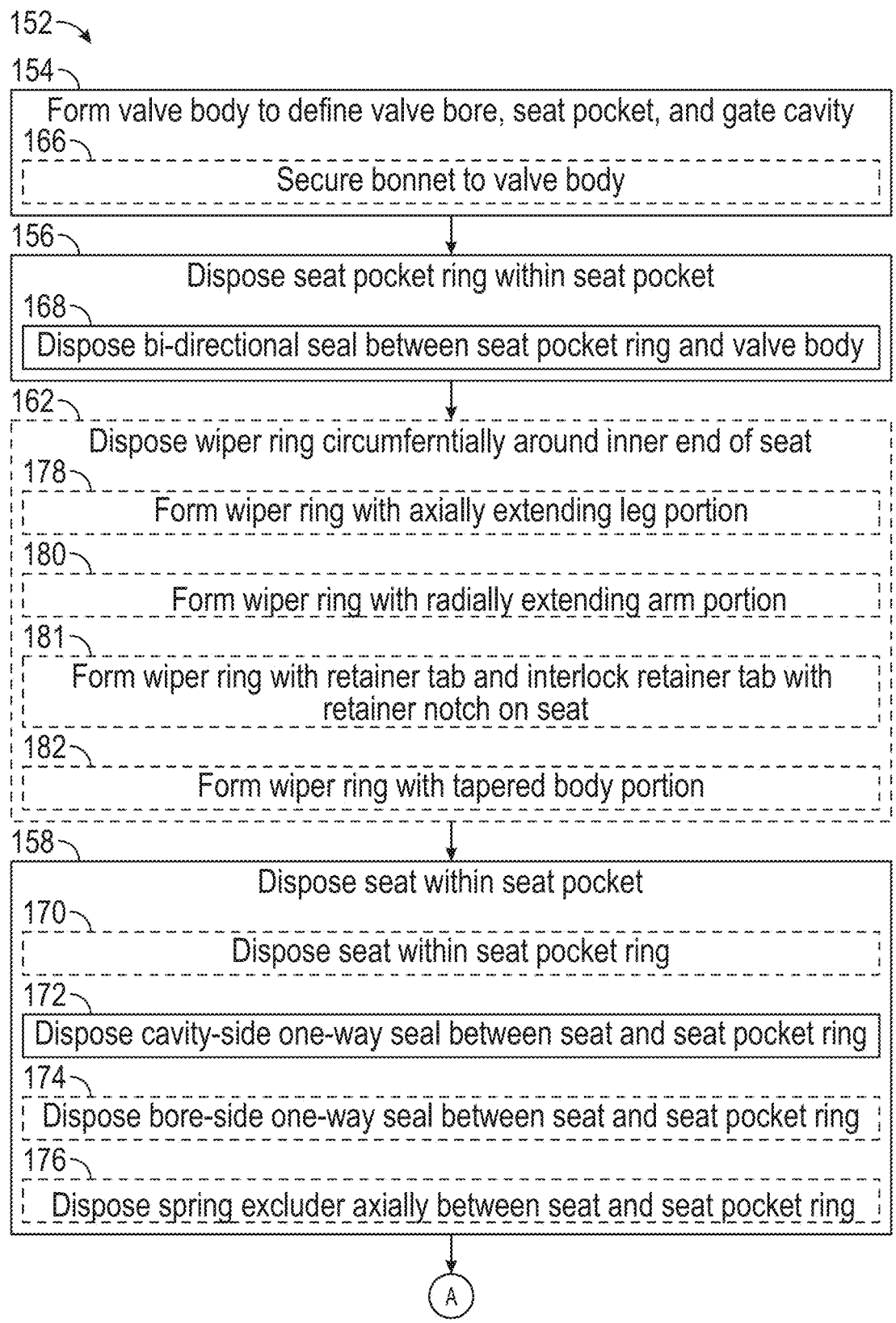
FIG. 7 is a flow diagram describing an example of a process for implementing (e.g., manufacturing and/or assembling) a fluid valve, in accordance with an embodiment of the present disclosure.
Figure 7:
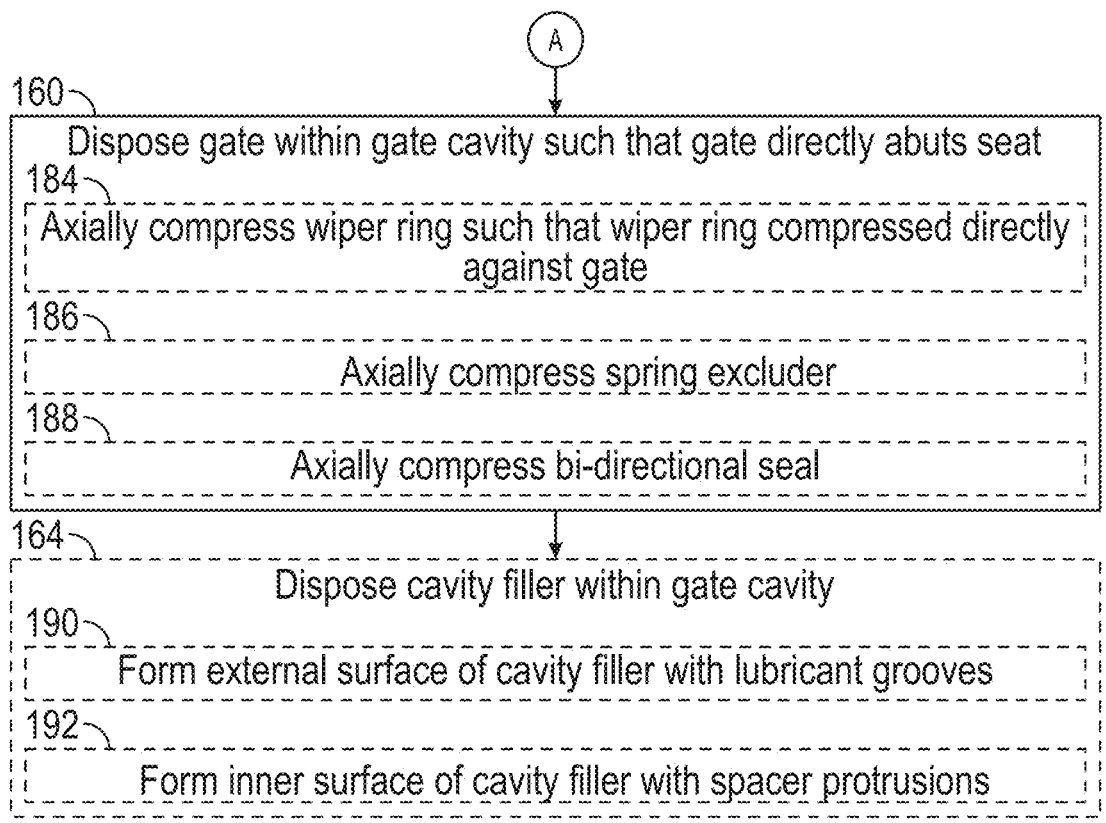

To help further illustrate, an example of a process 152 for implementing (e.g., manufacturing and/or assembling) a fluid valve 28 that may be deployed in a well system 10 is described in FIG. 7. Generally, the process 152 includes forming a valve body to define a valve bore, a seat pocket, and a gate cavity (process block 154). Additionally, the process 152 generally includes disposing a seat pocket ring within the seat pocket (process block 156), disposing a seat within the seat pocket (process block 158), and disposing a gate within the gate cavity such that the gate directly abuts the seat (process block 160).

However, it should be appreciated that the example process 152 is merely intended to be illustrative and not limiting. In particular, in other embodiments, a process 152 for implementing a fluid valve 28 may include one or more additional process blocks. For example, some embodiments of the process 152 may additionally include disposing a wiper ring circumferentially around an inner end of the seat (process block 162) while other embodiments of the process 152 do not. As another example, some embodiments of the process 152 may additionally include disposing a cavity filler within the gate cavity (process block 164) while other embodiments of the process 152 do not.

Additionally, in other embodiments of a process 152 for implementing a fluid valve 28, one or more of the depicted process blocks may be performed in a different order. For example, in other embodiments, the seat may be disposed within the seat pocket (process block 158) before the wiper ring is disposed circumferentially around the inner end of the seat (process block 162).

In any case, as described above, a fluid valve 28 that may be deployed in a well system 10 generally includes a valve body 68, which defines a valve bore 70, a gate cavity 78, and one or more seat pockets 90. Accordingly, implementing a fluid valve 28 generally includes forming (e.g., machining and/or milling) a valve body 68 to define a valve bore 70 that extends therethrough, a gate cavity 78 that intersects with the valve bore 70, and one or more seat pockets 90 that are each concentric with the valve bore 70 (process block 154). In some embodiments, the valve body 68 of a fluid valve 28 may be formed from metal, such as carbon steel or stainless steel.

Additionally, as described above, in some embodiments, one or more bonnets 84 may be secured to a valve body 68 to facilitate defining a gate cavity 78 therein. In other words, in such embodiments, a gate cavity 78 in a fluid valve 28 may defined at least in part by securing (e.g., bolting and/or welding) one or more bonnets 84 to the valve body 68 of the fluid valve 28 (process block 166).

Furthermore, as described above, a fluid valve 28 may generally include a seat pocket ring 98 disposed within a seat pocket 90 defined in its valve body 68. Accordingly, implementing a fluid valve 28 may generally include disposing a seat pocket ring 98 within a seat pocket 90 defined in its valve body 68 (process block 156). In particular, as described above, to facilitate blocking fluid flow through an interface between its valve body 68 and a seat pocket ring 98, a fluid valve 28 may include one or more bi-directional seals 108 compressed between the seat pocket ring 98 and the valve body 68. Accordingly, implementing a fluid valve 28 may generally include disposing one or more bi-directional seals 108 between its valve body 68 and a seat pocket ring 98, for example, in corresponding seal grooves 110 (process block 168).

Moreover, as described above, a fluid valve 28 may generally include a seat 92 disposed within a seat pocket 90 defined in its valve body 68. Accordingly, implementing a fluid valve 28 may generally include disposing a seat 92 within a seat pocket 90 defined in its valve body 68 (process block 158), for example, such that the seat 92 is disposed within a corresponding seat pocket ring 98 in the seat pocket 90 (process block 170).

As described above, to facilitate blocking inadvertent fluid flow from its valve bore 70 to its gate cavity 78 through an interface between a seat 92 and a corresponding seat pocket ring 98, a fluid valve 28 may additionally include a cavity-side one-way seal 112 disposed between the seat 92 and the seat pocket ring 98. Accordingly, implementing a fluid valve 28 generally includes disposing a cavity-side one-way seal 112 between a seat 92 and a corresponding seat pocket ring 98, for example, in a corresponding seal recess 114 (process block 172). In particular, in some embodiments, a cavity-side one-way seal 112 may be implemented in a fluid valve 28 by disposing a thermoplastic one-way seal 112 with a U-shaped cross-section between a seat 92 and a corresponding seat pocket ring 98 such that its open end opens toward the gate cavity 78 of the fluid valve 28.

In addition to a cavity-side one-way seal 112, as described above with regard to FIG. 3, to facilitate blocking inadvertent fluid flow from its gate cavity 78 to its valve bore 70 through an interface between a seat 92 and a corresponding seat pocket ring 98, in some embodiments, a fluid valve 28 may include a bore-side one-way seal disposed between the seat 92 and the seat pocket ring 98. Accordingly, in such embodiments, implementing a fluid valve 28 may include disposing a bore-side one-way seal 112 between a seat 92 and a corresponding seat pocket ring 98, for example, in a corresponding seal recess 114 (process block 174). In particular, in some such embodiments, a bore-side one-way seal 112 may be implemented in a fluid valve 28 by disposing a thermoplastic one-way seal 112 with a U-shaped cross-section between a seat 92 and a corresponding seat pocket ring 98 such that it opens toward the valve bore 70 of the fluid valve 28.

As described above, in embodiments of a fluid valve 28 that include a cavity-side one-way seal 112 as well as a bore-side one-way seal 112 between a seat 92 and a corresponding seat pocket ring 98, a pressure differential between the gate cavity 78 and the valve bore 70 of the fluid valve 28 may equalize through an interface between the seat 92 and the gate 76 of the fluid valve 28. In other words, in such embodiments, to enable pressure equalization, an axial inner surface 94 of the seat 92 may move axially away from an opposing sealing surface 96 of the gate 76 to enable fluid flow therebetween. However, as described above, at least in some instances, fluid flowed through the valve bore 70 of a fluid valve 28 may include solid particles mixed therein and excessive flow of solid particles into the gate cavity 78 of the fluid valve 28 may necessitate premature and/or frequent maintenance of the fluid valve 28.

Accordingly, as described above, to facilitate blocking flow of solid particles into its gate cavity 78, in some embodiments, a fluid valve 28 may include a wiper ring 116 disposed circumferentially around an axial inner end of a seat 92 such that the wiper ring 116 directly abuts its gate 76. In other words, in such embodiments, implementing a fluid valve 28 may include disposing a wiper ring 116 circumferentially around an axial inner end of a seat 92 (process block 162). In particular, in some such embodiments, a wiper ring 116 in a fluid valve 28 may be found at least in part using rubber and/or thermoplastic, such as polyether ether ketone (PEEK).

In any case, as described above with regard to FIG. 4, in some embodiments, a fluid valve 28 may include a spring excluder 146 disposed axially between a seat 92 and a corresponding seat pocket ring 98 such that the spring excluder 146 intersects with an interface between the seat 92 and the seat pocket ring 98, for example, instead of a bore-side one-way seal 112 to facilitate maintaining the seat 92 directly abutted against its gate 76 to maintain a fluid-tight metal-to-metal seal therebetween. Accordingly, in such embodiments, disposing a seat 92 within a seat pocket 90 may include disposing a spring excluder 146 axially between the seat 92 and a corresponding seat pocket ring 98 such that the spring excluder 146 intersects with an interface between the seat 92 and the seat pocket ring 98 (process block 176). In particular, in some such embodiments, a spring excluder 146 may be disposed axially between a shoulder 150 of a seat 92 and a leg portion 104 of a corresponding seat pocket ring 98.

Additionally, as described above, to facilitate enabling pressure equalization while blocking excessive flow of solid particles, in some such embodiments, a spring excluder 146 may be formed as a continuous ring of solid material, for example, instead of a coil spring. In particular, in some embodiments, a spring excluder 146 in a fluid valve 28 may be formed from elastic material, such as rubber or urethane. Furthermore, to facilitate permitting fluid flow there past and, thus, pressure equalization, in some embodiments, a spring excluder 146 in a fluid valve 28 may be formed with flow-through openings extending radially therethrough and/or notches (e.g., contours) extending radially along (e.g., across) an axial surface of the spring excluder 146.

In any case, as described above with regard to FIGS. 3 and 4, to facilitate direct abutment against a corresponding gate 76 and, thus, resistance to solid particle flow, in some embodiments, a wiper ring 116 in a fluid valve 28 may include a body portion 122, which directly abuts the gate 76, and a leg portion 120, which extends axially out from the body portion 122, for example, toward an open end of a cavity-side one-way seal 112 and/or such that the leg portion 120 directly abuts a shoulder 150 on a corresponding seat 92. Accordingly, in such embodiments, implementing a fluid valve 28 may include forming (e.g., molding and/or shaping) a wiper ring 116 with a body portion 122, which is implemented to directly abut its gate 76, and a leg portion 120, which extends axially out from the body portion 122 and is implemented to extend toward an open end of a cavity-side one-way seal 112 and/or to directly abut a shoulder 150 on a corresponding seat 92 (process block 178).

Additionally, as described above with regard to FIG. 3, to facilitate direct abutment against a corresponding gate 76 and, thus, resistance to solid particle flow, in some embodiments, a wiper ring 116 in a fluid valve 28 may include an arm portion 124, which extends radially inward from its body portion 122 such that it is disposed axially between the gate 76 and a corresponding seat 92. Accordingly, in such embodiments, implementing a fluid valve 28 may include forming (e.g., molding and/or shaping) a wiper ring 116 with an arm portion 124, which extends radially inward from its body portion 122 and is implemented to be disposed axially between a corresponding seat 92 and the gate 76 of the fluid valve 28, for example, in a corresponding ring recess 126 (process block 180).

Furthermore, as described above with regard to FIGS. 3 and 4, to facilitate retaining a wiper ring 116 with a corresponding seat 92, in some embodiments, the wiper ring 116 may include a retainer tab (e.g., protrusion) 128, which extends radially inward and interlocks with a retainer notch (e.g., groove) 130 on the seat 92. Accordingly, in such embodiments, implementing a fluid valve 28 may include forming a wiper ring 116 with a radially inwardly extending retainer tab 128 while disposing the wiper ring 116 around a seat 92 may include interlocking the retainer tab 128 on the wiper ring 116 with a retainer notch 130 on the seat 92 (process block 181).

Moreover, as described above with regard to FIG. 4, to facilitate reducing the likelihood of force sufficient to move a gate 76 inadvertently being increased and/or the gate 76 inadvertently catching on a wiper ring 116, in some embodiments, the body portion 122 of the wiper ring 116 may be tapered radially inward toward a leg portion 120 of the wiper ring 116, include an axial inner surface 118 that is slanted axially inwardly when not abutted against the gate 76, and/or include a beveled edge 151 that is connected to its axial inner surface 118 such that the beveled edge 151 opposes the gate 76. Accordingly, in such embodiments, implementing a fluid valve 28 may include forming (e.g., molding and/or shaping) a wiper ring 116 with a tapered body portion 122, which tapers radially inward to a leg portion 120, includes an axial inner surface 118 that slants axially inwardly when not abutted against a corresponding gate 76, and/or includes a beveled edge 151 connected to the axial inner surface 118 and implemented to oppose the gate 76 (process block 182).

In any case, as described above, a fluid valve 28 generally includes a gate 76 disposed within its gate cavity 78 such that the gate 76 directly abuts a corresponding seat 92. Accordingly, implementing a fluid valve 28 generally includes disposing a gate 76 within its gate cavity 78 such that the gate 76 directly abuts a seat 92 (process block 160). In particular, as described above, to facilitate maintaining a wiper ring 116 in sealing contact with a corresponding gate 76, in some embodiments, the wiper ring 116 may be pre-loaded such that the wiper ring 116 is axially compressed against the gate 76. Accordingly, in such embodiments, disposing a gate 76 within a corresponding gate cavity 78 may include axially compressing a corresponding wiper ring 116 against the gate 76 (process block 184).

Additionally, as described above, to facilitate maintaining a fluid-tight metal-to-metal seal between a seat 92 and a corresponding gate 76, in some embodiments, a spring excluder 146 disposed axially between the seat 92 and a corresponding seat pocket ring 98 may be pre-loaded such that spring excluder 146 pushes the seat 92 axially against the gate 76. Accordingly, in such embodiments, disposing a gate 76 within a corresponding gate cavity 78 may include axially compressing a spring excluder 146 between a seat pocket ring 98 and a corresponding seat 92 (process block 186).

Furthermore, as described above, in some embodiments, a fluid valve 28 may include a bi-directional seal 108 disposed axially between a seat pocket ring 98 and its valve body 68. Accordingly, in such embodiments, disposing a gate 76 within a corresponding gate cavity 78 may include axially compressing a bi-directional seal 108 between a seat pocket ring 98 and a valve body 68 (process block 188).

Moreover, as described above, to facilitate reducing lubricant sufficient to lubricate its gate 76 while blocking excessive flow of solid particles from a flow-through opening of its gate 76 into its gate cavity 78, in some embodiments, a fluid valve 28 may include a cavity filler 89 disposed within the gate cavity 78. Accordingly, in such embodiments, implementing a fluid valve 28 may include disposing a cavity filler 89 within its gate cavity 78, for example, such that the cavity filler 89 axially overlaps with a flow-through opening 80 in a gate 76 of the fluid valve 28 at least while the fluid valve 28 is in its closed state (process block 164).

In particular, as described above, in some embodiments, a cavity filler 89 in a fluid valve 28 may include lubricant grooves 136 that run circumferentially along its external surface 134, for example, to facilitate uniformly distributing lubricant around a corresponding gate cavity 78. Accordingly, in such embodiments, implementing a fluid valve 28 may include forming (e.g., molding and/or shaping) a cavity filler 89 with an external surface 134 that includes circumferential lubricant grooves 136 (process block 190).

Additionally, as described above, in some embodiments, a cavity filler 89 in a fluid valve 28 may include spacer protrusions 138 on its internal surface 140 that directly abut a corresponding gate 76, for example, to facilitate limiting flow of solid particles from the flow-through opening 80 of the gate 76 into a corresponding gate cavity 78 while displacing solid particles that enter the gate cavity 78 to facilitate reducing the likelihood of the solid particles being compressed directly between the cavity filler 89 and the gate 76. Accordingly, in such embodiments, implementing a fluid valve 28 may include forming (e.g., molding and/or shaping) a cavity filler 89 with an internal surface 140, which includes spacer protrusions 138 that are implemented to directly abut the gate 76 of the fluid valve 28 to produce a gap 142 between the gate 76 and the internal surface 140 of the cavity filler 89 (process block 192).

However, it should again be appreciated that the described examples are merely intended to be illustrative and not limiting. In any case, in this manner, the present disclosure describes a fluid valve 28 that may be deployed in a well system 10 and techniques for implementing (e.g., manufacturing and/or assembling) the fluid valve 28 to facilitate reducing valve maintenance, which, at least in some instances, facilitates improving production time and, thus, operational efficiency of the well system 10.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A well system comprising a fluid valve, wherein the fluid valve comprises:
    a valve body configured to define a valve bore, a gate cavity that intersects with the valve bore, and a seat pocket concentric with the valve bore;
    a gate configured to be disposed within the gate cavity;
    a seat pocket ring configured to be disposed within the seat pocket;
    a bi-directional seal configured to be axially compressed between the valve body and the seat pocket ring;
    a seat configured to be disposed within the seat pocket ring such that an axial inner surface of the seat directly abuts an opposing sealing surface of the gate;
    a one-way seal configured to be disposed between the seat pocket ring and the seat to block fluid flow from the gate cavity to the valve bore through an interface between the seat and the seat pocket ring;
    a spring excluder configured to be compressed axially between the seat and the seat pocket ring such that the spring excluder intersects with the interface between the seat pocket ring and the seat; and
    a wiper ring configured to be disposed circumferentially around an axial inner end of the seat such that another axial inner surface of the wiper ring directly abuts the opposing sealing surface of the gate, wherein the wiper ring is configured to offset axial force exerted on the seat by the spring excluder to facilitate reducing force sufficient to move the gate and, thus, to transition the fluid valve between an open state and a closed state while maintaining the axial inner surface of the seat directly abutted against the opposing sealing surface of the gate.

2. The well system of claim 1, wherein the spring excluder is configured to:
    push the seat axially toward the gate to facilitate maintaining a metal-to-metal seal between the axial inner surface of the seat and the opposing sealing surface of the gate;
    permit flow of fluid from the valve bore to the gate cavity through the interface between the seat pocket ring and the seat to facilitate pressure equalization; and
    block flow of solid particles through the interface between the seat and the seat pocket ring into the gate cavity.

3. The well system of claim 1, wherein the wiper ring comprises:
    a body portion configured to axially abut the opposing sealing surface of the gate; and
    a leg portion that extends out axially from the body portion, wherein:
        the leg portion of the wiper ring is configured to axially abut a shoulder on the seat;
        the body portion of the wiper ring tapers radially inward to the leg portion and comprises a beveled edge connected to the another axial inner surface of the wiper ring; and
        the another axial inner surface of the wiper ring is configured to slant axially inward to the beveled edge when not abutted against the opposing seal surface of the gate.

4. The well system of claim 1, wherein:
    the wiper ring comprises polyether ether ketone; and
    the spring excluder comprises urethane.

5. The well system of claim 1, comprising one or more cavity fillers configured to be disposed within the gate cavity of the fluid valve such that the one or more cavity fillers block an open end of a pass-through opening in the gate while the fluid valve is in a closed state to block flow of solid particles from the pass-through opening into the gate cavity.

6. The well system of claim 5, wherein an external surface of the one or more cavity fillers comprises circumferential lubricant grooves configured to facilitate uniformly distributing lubricant around the gate cavity.

7. The well system of claim 5, wherein an internal surface of the one or more cavity fillers comprises spacer protrusions configured to directly abut the opposing sealing surface of the gate such that a gap is present between the internal surface of the one or more cavity fillers and the opposing sealing surface of the gate to facilitate:
    distributing lubricant along the gate; and
    displacing solid particles, which flow into the gate cavity from a flow-through opening in the gate while the fluid valve is in a closed state, into the gap between the internal surface of the one or more cavity fillers and the opposing sealing surface of the gate.

8. A well system comprising a fluid valve, wherein the fluid valve comprises:
a valve body configured to define a valve bore, a gate cavity that intersects with the valve bore, and a seat pocket concentric with the valve bore;
a gate configured to be disposed within the gate cavity;
a seat pocket ring configured to be disposed within the seat pocket;
a bi-directional seal configured to be axially compressed between the valve body and the seat pocket ring;
a seat configured to be disposed within the seat pocket ring such that an axial inner surface of the seat directly abuts an opposing sealing surface of the gate;
a one-way seal configured to be disposed between the seat pocket ring and the seat to block fluid flow from the gate cavity to the valve bore through an interface between the seat and the seat pocket ring;
a spring excluder configured to be compressed axially between the seat and the seat pocket ring such that the spring excluder intersects with the interface between the seat pocket ring and the seat; and
one or more cavity fillers configured to be disposed within the gate cavity of the fluid valve such that the one or more cavity fillers block an open end of a pass-through opening in the gate while the fluid valve is in a closed state to block flow of solid particles from the pass-through opening into the gate cavity, wherein an external surface of the one or more cavity fillers comprises circumferential lubricant grooves configured to facilitate uniformly distributing lubricant around the gate cavity.

9. The well system of claim 8, wherein the fluid valve comprises a wiper ring configured to be disposed circumferentially around an axial inner end of the seat such that another axial inner surface of the wiper ring directly abuts the opposing sealing surface of the gate.

10. The well system of claim 9, wherein the wiper ring comprises:
a body portion configured to axially abut the opposing sealing surface of the gate; and
a leg portion that extends out axially from the body portion, wherein:
the leg portion of the wiper ring is configured to axially abut a shoulder on the seat;
the body portion of the wiper ring tapers radially inward to the leg portion and comprises a beveled edge connected to the another axial inner surface of the wiper ring; and
the another axial inner surface of the wiper ring is configured to slant axially inward to the beveled edge when not abutted against the opposing seal surface of the gate.

11. The well system of claim 9, wherein:
the wiper ring comprises polyether ether ketone; and
the spring excluder comprises urethane.

12. The well system of claim 8, wherein the spring excluder is configured to:
push the seat axially toward the gate to facilitate maintaining a metal-to-metal seal between the axial inner surface of the seat and the opposing sealing surface of the gate;
permit flow of fluid from the valve bore to the gate cavity through the interface between the seat pocket ring and the seat to facilitate pressure equalization; and
block flow of solid particles through the interface between the seat and the seat pocket ring into the gate cavity.

13. The well system of claim 8, wherein the one-way seal of the fluid valve has a U-shaped cross-section with an open end that opens toward the gate.

14. A well system comprising a fluid valve, wherein the fluid valve comprises:
a valve body configured to define a valve bore, a gate cavity that intersects with the valve bore, and a seat pocket concentric with the valve bore;
a gate configured to be disposed within the gate cavity;
a seat pocket ring configured to be disposed within the seat pocket;
a bi-directional seal configured to be axially compressed between the valve body and the seat pocket ring;
a seat configured to be disposed within the seat pocket ring such that an axial inner surface of the seat directly abuts an opposing sealing surface of the gate;
a one-way seal configured to be disposed between the seat pocket ring and the seat to block fluid flow from the gate cavity to the valve bore through an interface between the seat and the seat pocket ring;
a spring excluder configured to be compressed axially between the seat and the seat pocket ring such that the spring excluder intersects with the interface between the seat pocket ring and the seat; and
one or more cavity fillers configured to be disposed within the gate cavity of the fluid valve such that the one or more cavity fillers block an open end of a pass-through opening in the gate while the fluid valve is in a closed state to block flow of solid particles from the pass-through opening into the gate cavity, wherein an internal surface of the one or more cavity fillers comprises spacer protrusions configured to directly abut the opposing sealing surface of the gate such that a gap is present between the internal surface of the one or more cavity fillers and the opposing sealing surface of the gate to facilitate:
distributing lubricant along the gate; and
displacing solid particles, which flow into the gate cavity from a flow-through opening in the gate while the fluid valve is in a closed state, into the gap between the internal surface of the one or more cavity fillers and the opposing sealing surface of the gate.

15. The well system of claim 14, wherein an external surface of the one or more cavity fillers comprises circumferential lubricant grooves configured to facilitate uniformly distributing lubricant around the gate cavity.

16. The well system of claim 14, wherein the fluid valve comprises a wiper ring configured to be disposed circumferentially around an axial inner end of the seat such that another axial inner surface of the wiper ring directly abuts the opposing sealing surface of the gate.

17. The well system of claim 16, wherein the wiper ring comprises:
a body portion configured to axially abut the opposing sealing surface of the gate; and
a leg portion that extends out axially from the body portion, wherein:
the leg portion of the wiper ring is configured to axially abut a shoulder on the seat;
the body portion of the wiper ring tapers radially inward to the leg portion and comprises a beveled edge connected to the another axial inner surface of the wiper ring; and the another axial inner surface of the wiper ring is configured to slant axially inward to the beveled edge when not abutted against the opposing seal surface of the gate.

18. The well system of claim 16, wherein:
the wiper ring comprises polyether ether ketone; and
the spring excluder comprises urethane.

19. The well system of claim 14, wherein the spring excluder is configured to:
push the seat axially toward the gate to facilitate maintaining a metal-to-metal seal between the axial inner surface of the seat and the opposing sealing surface of the gate;
permit flow of fluid from the valve bore to the gate cavity through the interface between the seat pocket ring and the seat to facilitate pressure equalization; and
block flow of solid particles through the interface between the seat and the seat pocket ring into the gate cavity.

20. The well system of claim 14, wherein the one-way seal of the fluid valve has a U-shaped cross-section with an open end that opens toward the gate.

\* \* \* \* \*